CONVEYING STRUCTURE FOR STORING ARTICLES AT DIFFERENT LEVELS

Original Filed Feb. 28, 1964 17 Sheets-Sheet 1

INVENTOR.
Gunnar Thure Eliassen
BY
[signature]
his ATTORNEY

INVENTOR.
Gunnar Thure Eliassen
BY
his ATTORNEY

CONVEYING STRUCTURE FOR STORING ARTICLES AT DIFFERENT LEVELS

Original Filed Feb. 28, 1964

INVENTOR.
Gunnar Thore Eliassen
BY
[signature]
his ATTORNEY.

CONVEYING STRUCTURE FOR STORING ARTICLES AT DIFFERENT LEVELS

Original Filed Feb. 28, 1964 17 Sheets-Sheet 4

INVENTOR.
Gunnar Thure Eliassen
BY
[signature]
his ATTORNEY

INVENTOR.
Gunnar Thure Eliassen
BY
[signature]
his ATTORNEY

CONVEYING STRUCTURE FOR STORING ARTICLES AT DIFFERENT LEVELS

INVENTOR.
Gunnar Thure Eliassen
BY
[signature]
his ATTORNEY

INVENTOR.
Gunnar Thure Eliassen
BY
[signature]
his ATTORNEY

CONVEYING STRUCTURE FOR STORING ARTICLES AT DIFFERENT LEVELS

Original Filed Feb. 28, 1964

INVENTOR.
Gunnar Thure Eliassen
BY
[signature]
his ATTORNEY

CONVEYING STRUCTURE FOR STORING ARTICLES AT DIFFERENT LEVELS

INVENTOR.
Gunnar Thure Eliassen
BY
[signature]
his ATTORNEY

March 3, 1970 G. T. ELIASSEN 3,498,478

CONVEYING STRUCTURE FOR STORING ARTICLES AT DIFFERENT LEVELS

Original Filed Feb. 28, 1964 17 Sheets-Sheet 10

INVENTOR.
Gunnar Thure Eliassen
BY
[signature]
his ATTORNEY

INVENTOR.
Gunnar Thure Eliassen
BY
[signature]
his ATTORNEY

INVENTOR.

BY his ATTORNEY

CONVEYING STRUCTURE FOR STORING ARTICLES AT DIFFERENT LEVELS

Original Filed Feb. 28, 1964 17 Sheets-Sheet 13

INVENTOR.
Gunnar Thure Eliassen

BY his ATTORNEY

CONVEYING STRUCTURE FOR STORING ARTICLES AT DIFFERENT LEVELS

Original Filed Feb. 28, 1964

INVENTOR.
Gunnar Thore Eliassen
BY
W. Kerrwaker
his ATTORNEY

CONVEYING STRUCTURE FOR STORING ARTICLES AT DIFFERENT LEVELS

Original Filed Feb. 28, 1964

17 Sheets-Sheet 15

INVENTOR.
Gunnar Thure Eliassen
BY
his ATTORNEY

March 3, 1970 G. T. ELIASSEN 3,498,478

CONVEYING STRUCTURE FOR STORING ARTICLES AT DIFFERENT LEVELS

Original Filed Feb. 28, 1964 17 Sheets-Sheet 16

INVENTOR.
Gunnar Thune Eliassen
BY
[signature]
his ATTORNEY

CONVEYING STRUCTURE FOR STORING ARTICLES AT DIFFERENT LEVELS

Original Filed Feb. 28, 1964 17 Sheets-Sheet 17

INVENTOR.
Gunnar Thure Eliassen
BY
his ATTORNEY

United States Patent Office 3,498,478

Patented Mar. 3, 1970

3,498,478

CONVEYING STRUCTURE FOR STORING ARTICLES AT DIFFERENT LEVELS

Gunnar Thure Eliassen, Saffle, Sweden, assignor to Aktiebolaget Electrolux, Stockholm, Sweden, a corporation of Sweden Original application Feb. 28, 1964, Ser. No. 348,213, now Patent No. 3,361,079, dated Jan. 2, 1968. Divided and this application Oct. 30, 1967, Ser. No. 678,835

Claims priority, application Sweden, Feb. 28, 1963, 2,226/63

Int. Cl. B65g *11/06*

U.S. Cl. 214—16.4 11 Claims

ABSTRACT OF THE DISCLOSURE

A multi-level conveyor system having a plurality of storage lines at each level to which articles can automatically be supplied by a distributing line and from which articles can automatically be collected by a collecting line, a first elevator for automatically moving articles from a feed line to the distributing lines, a second elevator for automatically moving articles from the collecting lines to a delivery line, the elevators having vertically movable platforms, a first member movable between a first stop position in the path of articles moving from the feed line to the first elevator and a second clear position, a second member movable between a first stop position in the path of articles moving from each of the collecting lines to the second elevator and a second clear horizontal position upon which articles from a collecting line can move, the platform of the second elevator receiving articles from each of the second members when it is in its first stop position, first mechanism for moving the first member to its first stop and second clear positions, second mechanism for moving each of the second members to its first and its second positions, and controls for controlling the first and second mechanisms.

This application is a division of my application Ser. No. 348,213, filed Feb. 28, 1964, for "Conveyor System," now Patent No. 3,361,079, granted Jan. 2, 1968.

BRIEF SUMMARY OF THE INVENTION

My invention relates to conveying structure for storing articles at different levels.

An object of my invention is to provide an improved conveyor structure having a conveyor system including article supply and article collecting lines, respectively, and a plurality of storage lines therebetween which are arranged at different levels and to which articles are raised and lowered, respectively, by elevators or lifts.

Another object of my invention is to provide an improved conveyor structure of this type in which the storage paths at different levels are in adjacent vertical banks with the vertically spaced storage lines in each bank one above another.

A further object of my invention is to provide article supply lines and article collecting lines one above another at opposite ends of the storage lines and raising articles from a feed line to the article supply lines at the different levels by a single elevator or lift and lowering articles from the article collecting lines at the different levels by a single elevator or lift to an article delivery line.

A still further object of my invention is to provide a conveyor system having a dispatching unit which is operated by material fed thereto and includes dispatching information that functions to selectively transfer articles automatically from the article feed line to a particle storage path in one of the different levels of the conveyor structure.

I accomplish this by providing groups of storage lines to each of which articles can be supplied by means including a distributing line and from each of which articles can be removed by means including a collecting line, the distributing lines collectively functioning as distributing means and the collecting lines collectively functioning as collecting means.

The system has a common feed line and a delivery line, respectively, and elevator means having vertically moving platforms and means for moving the platforms, a plurality of the storage lines being disposed at a number of different levels one above another.

The article supply means includes the elevator means for moving the articles from the feed line to a plurality of the storage lines at the different levels by the distributing means and the article removal means includes the elevator means for moving the articles to the delivery line from the plurality of storage lines at the different levels by the collecting means.

The platforms may have inclined surfaces for supporting thereon the articles being moved by the elevator means to promote movement of the articles from the inclined surfaces by gravity, each of the platforms having holding means to hold on its inclined surface at least one article supported thereon when the platform is being moved vertically by its moving means, and means for rendering the holding means ineffective and enable the articles to move from the inclined surfaces when the platforms are at appropriate levels for the articles to move from the inclined surfaces.

The conveyor structure includes a first movable member operable to move to first and second positions and in the first position of which it is in the path of articles moving in a first path of movement from the feed line to the elevator means, a second movable member operable to move to first and second positions and in the first position of which it is in the path of articles moving in a second path of movement from each of the collecting lines to the elevator means, first moving means for moving the first member to its first and second positions, second moving means for moving the second member in each of the second paths of movement to its first and second positions, and means for controlling the first and second moving means.

DETAILED DESCRIPTION

Figure 1:
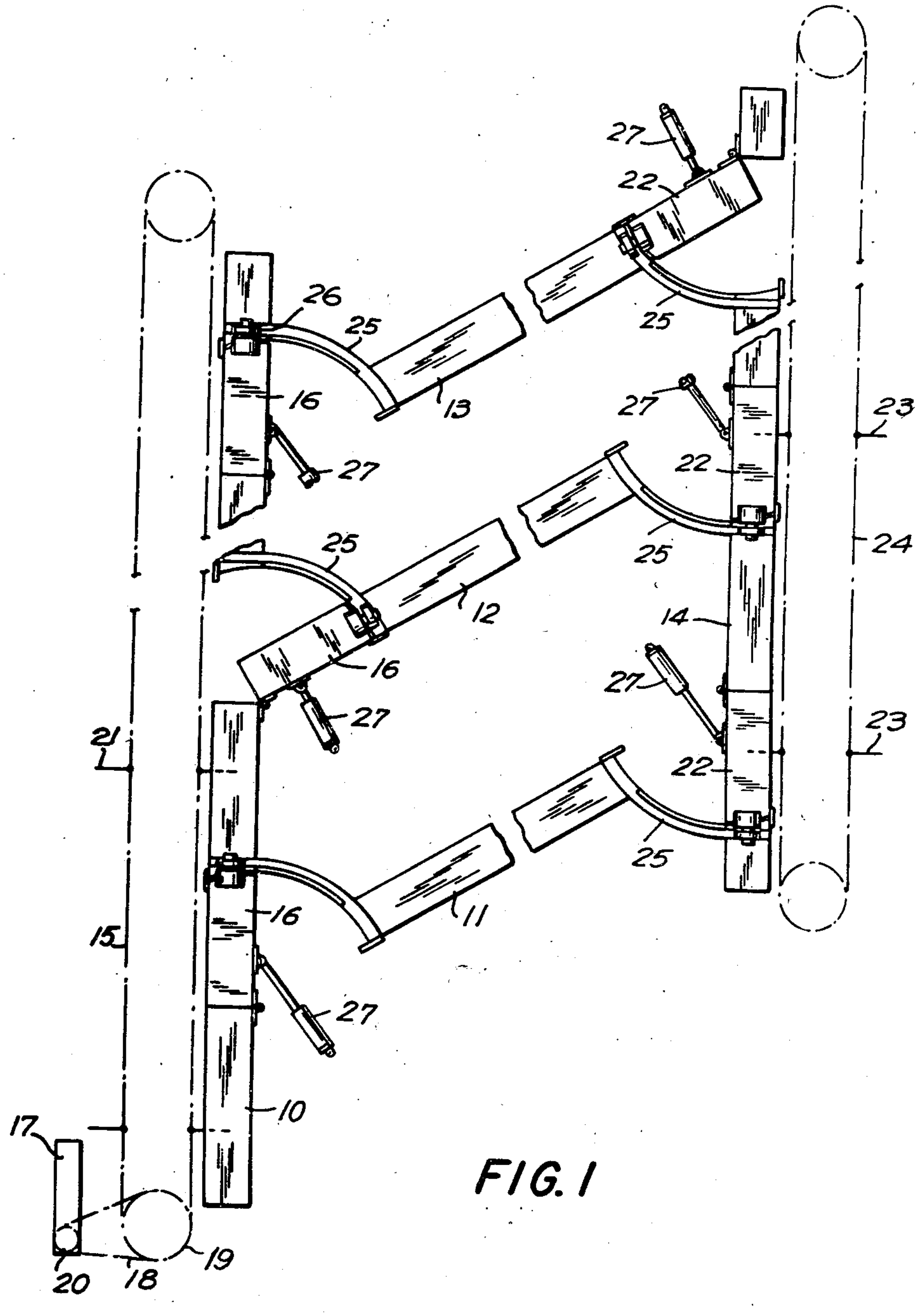
FIG. 1 is a top plan view diagrammatically illustrating an embodiment of my invention for sorting and storing articles.

In FIGS. 1 to 7 I have diagrammatically illustrated apparatus embodying my invention which includes an article receiving line or path 10 to one end of which articles are supplied in a manner described hereinafter and from which articles are selectively distributed to a plurality of storage paths or lines 11, 12 and 13, and from which storage paths the articles are selectively removed to an article delivery line 14. Any number of storage paths or lines may be provided, and in the embodiment illustrated three such paths are shown.

When a variety of articles are being moved on the article receiving line 10, for example, switch or transfer units 16 may be employed to transfer from the receiving line to each of the storage lines articles which are of the same kind or generally similar to one another. Each article is automatically transferred from the article receiving line or path 10 to a selected storage path by information received at a dispatching unit 17 which functions to cause a particular switch unit 16 to become operable to transfer a selected article automatically from the article receiving line 10 to a particular storage path.

Figure 6:
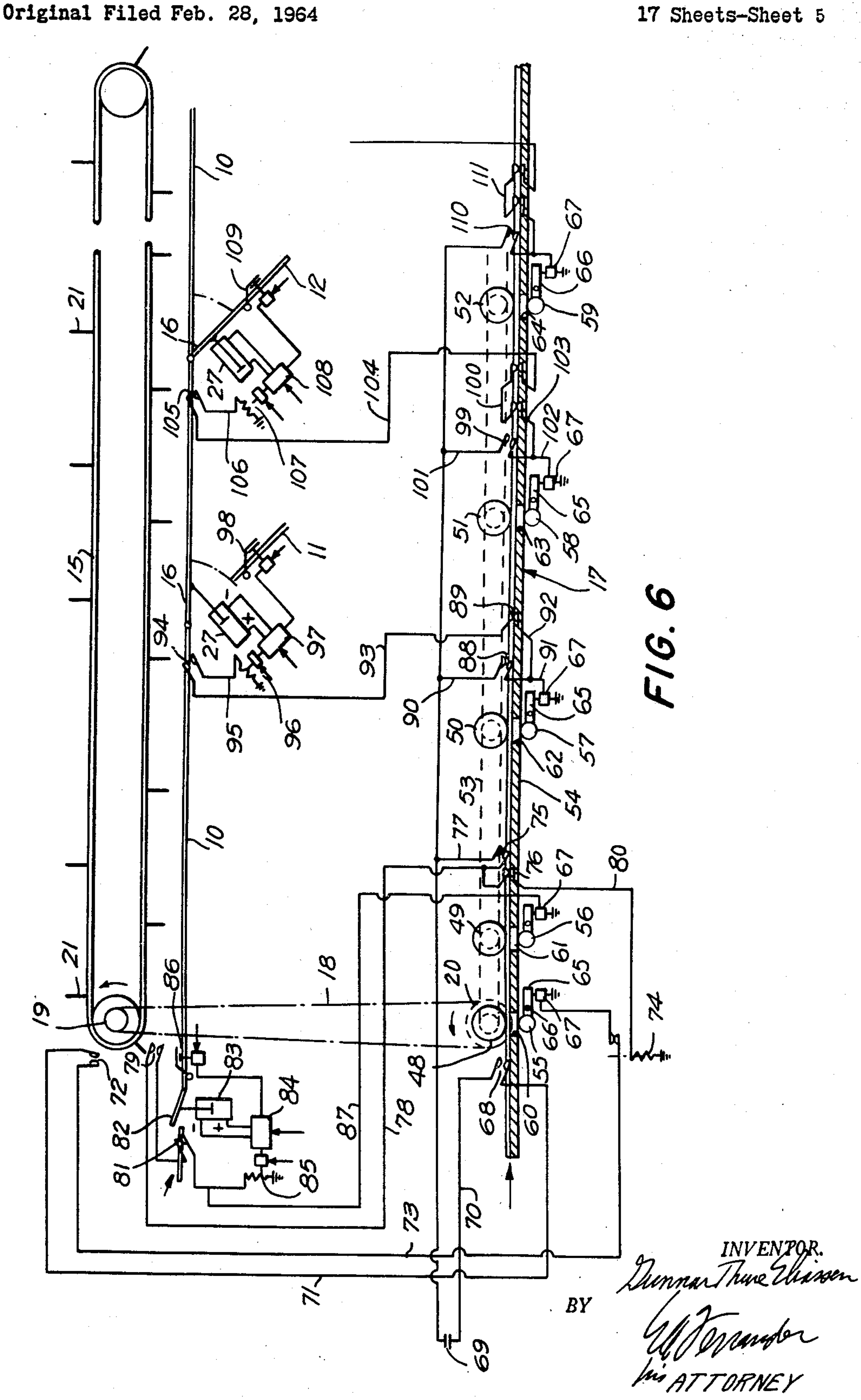
FIG. 6 is a diagrammatic representation of a control and electrical circuit therefor for controlling the movement of articles on the receiving line and the selective transfer of the articles therefrom to the storage paths.

An endless belt 15, which is arranged adjacent to the article receiving line 10 and driven in any suitable manner, as by an electric motor, for example, passes over spaced rollers, one of which is indicated at 19 in FIGS. 1 and 6. Members 21 are distributed along the belt 15 and extend outward therefrom. The members 21, which are equally spaced from one another on the belt 15, function to propel and horizontally move the articles on the article receiving line or path, as will be described presently. The dispatching unit 17 includes mechanism which is driven in synchronism with the article propelling belt 15 and actuated through speed reduction mechanism comprising an endless belt 18 passing over the roller 19 and a roller 20 forming a component of the dispatching unit.

Figure 7:
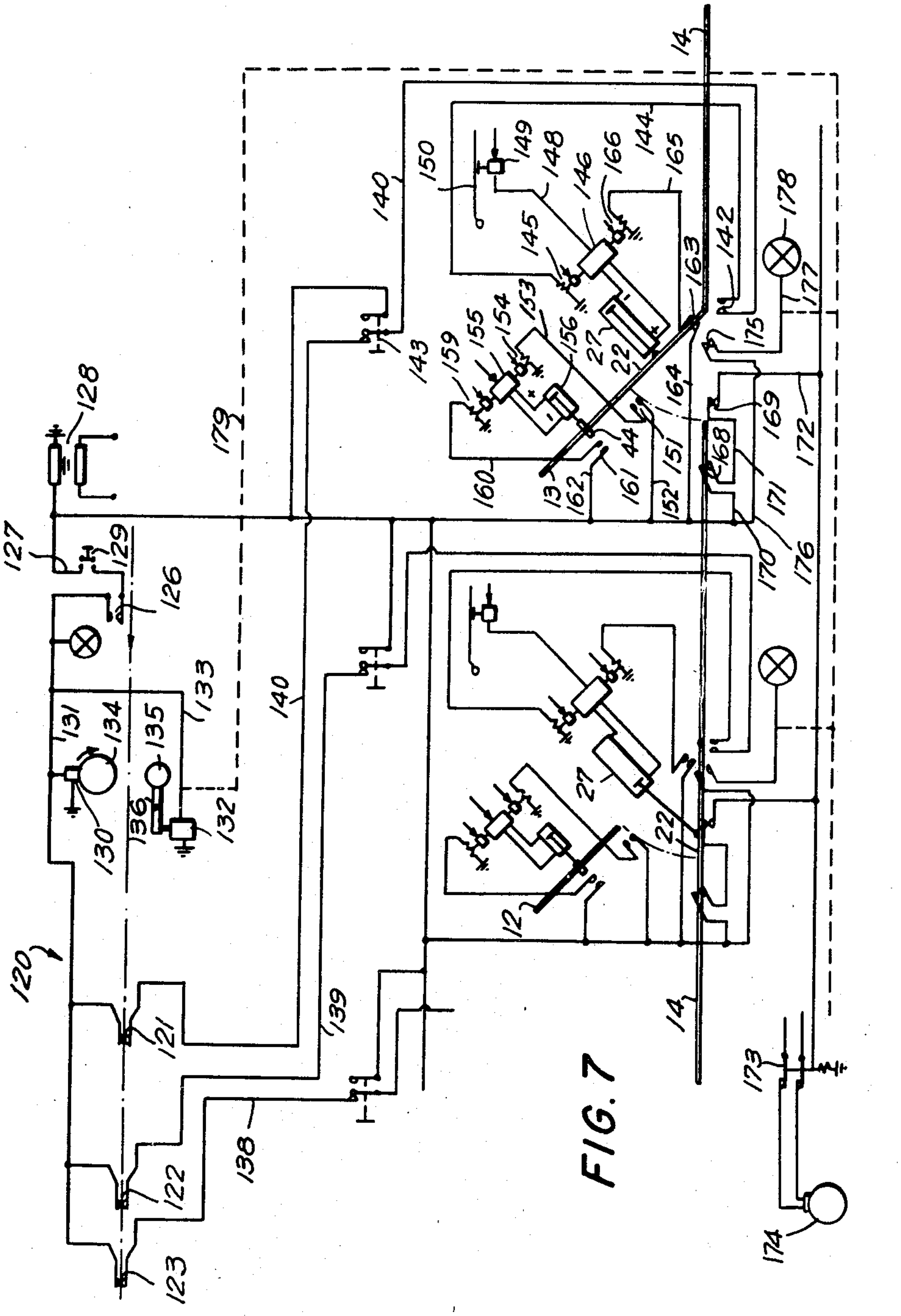
FIG. 7 is a diagrammatic representation of a control and electrical circuit therefor for controlling the selective transfer of articles from the storage paths to the article delivery line and the movement of the transferred articles on the delivery line.

The articles can be selectively transferred by switch or transfer units 22 from the storage paths 11, 12 and 13 to the article delivery line or path 14. An endless belt 24, which is adjacent to the article delivery line 14 and like the belt 15 and driven by a motor 174, as shown in FIG. 7, is provided with spaced members 23 which extend outward therefrom and are equally spaced from one another and function to propel and horizontally move the articles transferred to the article delivery line 14.

Figure 4:
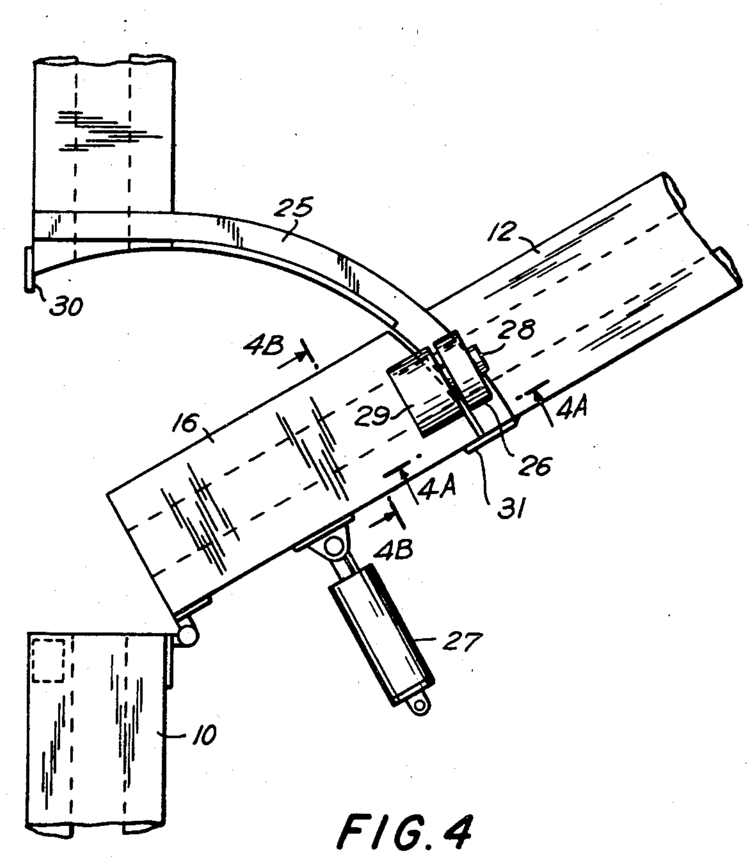
FIG. 4 is an enlarged top plan view of a transfer or switch unit shown in FIG. 1 for transferring a carrier unit and article carried thereby from a receiving line to a storage line.

The switch or transfer units 16 and 22 are horizontally disposed and pivotally mounted on the article receiving and delivery lines 10 and 14, respectively, and their outer ends engage and move over horizontally disposed rails 25 of arcuate form in top plan view, as shown in FIGS. 1 and 4. One end of each rail 25 is at the vicinity of the article receiving line 10 or article delivery line 14 and the other end thereof is at the vicinity of a different one of the storage paths 11, 12 and 13. I accomplish this by providing at the outer end of each switch unit 16 and 22 a roller 26 which is rotatably mounted thereon and rolls over one of the horizontally disposed rails 25 when movement is imparted to the switch unit by a pneumatically operated cylinder 27. With this arrangement, the switch or transfer units 16 and 22 can be moved from first positions in which they form a section of the article receiving or article delivery lines 10 and 14, respectively, to second positions in which they form sections of the storage paths 11, 12 and 13.

Figure 4A:
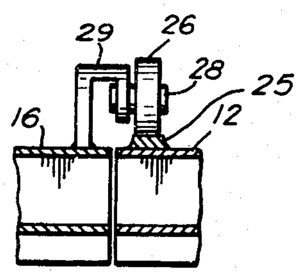
FIGS. 4A and 4B are sectional views taken at lines 4A—4A and 4B—4B, respectively, of FIG. 4.
Figure 4B:
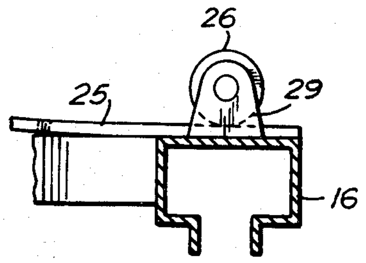

As shown in FIGS. 4 and 4A, the roller 26 is rotatably mounted on a horizontal pin 28 fixed to a bracket 29 provided at the outer end of the switch unit 16 which transfers articles from the article receiving line 10 to the storage path 12. As seen in FIG. 4B, the rail 25 slopes horizontally downward from the article receiving line 10 to the storage line 12 which in turn slopes downward to the article delivery line 14. With this arrangement, articles transferred from the article receiving line 10 to the storage lines move horizontally downward by gravity to the lower ends of the storage lines. As seen in FIG. 4, stops 30 and 31 are provided in the article receiving line 10 and storage paths, respectively, to limit horizontal swinging movement of the switch or transfer units and make certain that they are in proper alignment with the article receiving line and the storage line, respectively, when moved thereto.

Figure 2:
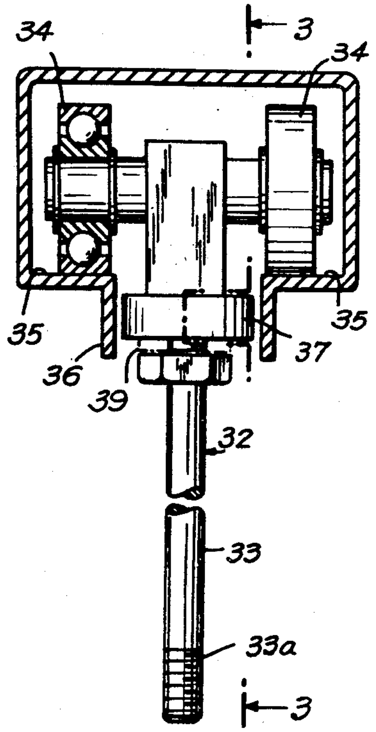
FIG. 2 is a transverse sectional view of a track illustrating one practical form the conveyor and storage lines or paths of FIG. 1 may take and a wheeled carrier unit movable thereon.
Figure 3:
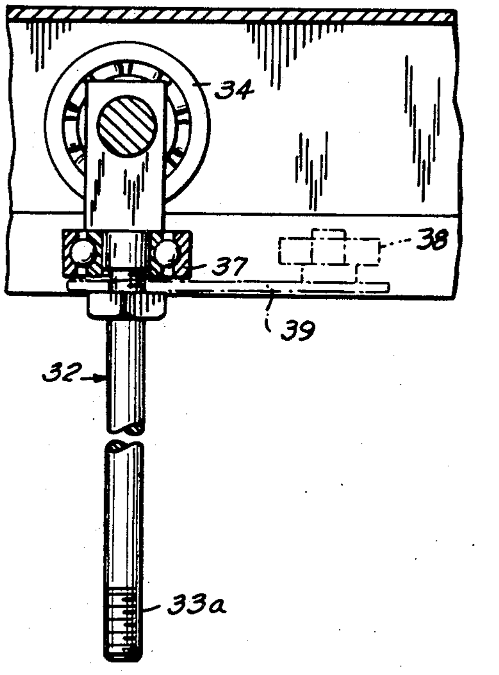
FIG. 3 is a vertical view, partly in section, taken at line 3—3 of FIG. 2.

In the embodiment being described, the articles are suspended from and carried by carrier units 32 having downwardly depending rods 33 provided with lower threaded ends 33*a* to which may be removably connected suitable members (not shown) for carrying the articles to be sorted and stored in the different storage paths. As shown in FIGS. 2 and 3, the vertical rods 33 form part of T-shaped members having top horizontal arms at the opposite ends of which are rotatably mounted wheels or rollers 34, the outer rims of which form the outer races of ball bearings. The article receiving and delivery paths 10 and 14 and storage paths therebetween are formed of elongated members which in transverse section are rectangular and include bottom horizontal wall sections 35 which extend inward from vertical wall sections and at their inner extremities are spaced from one another and provided with downwardly extending flanges 36.

The spaced horizontal wall sections 35 serve as a horizontally extending track for the carrier units 32 over which the wheels 34 move. Rollers 37, the outer rims of which form the outer races of ball bearings, are provided on the vertical rods 33 between the vertical flanges 36 to guide the carrier units 32 during their horizontal movement on the horizontal wall sections 35. The vertical rod 33 of each carrier unit extends through an opening formed at one end of a holder 39 which extends lengthwise of the flanges 36 and in the gap therebetween. The holders 39 are held on the vertical rods 33 at the level of the flanges 36 and at their outer ends are provided with ball bearings 38, as indicated in dotted lines in FIG. 3, which are similar to the ball bearings 37. The ball bearings 38 function to guide the carrier units 32 between the flanges 36 and may be disposed ahead of or to the rear of the carrier units during their movement on the article receiving and delivery paths and on the storage paths.

Figure 5:
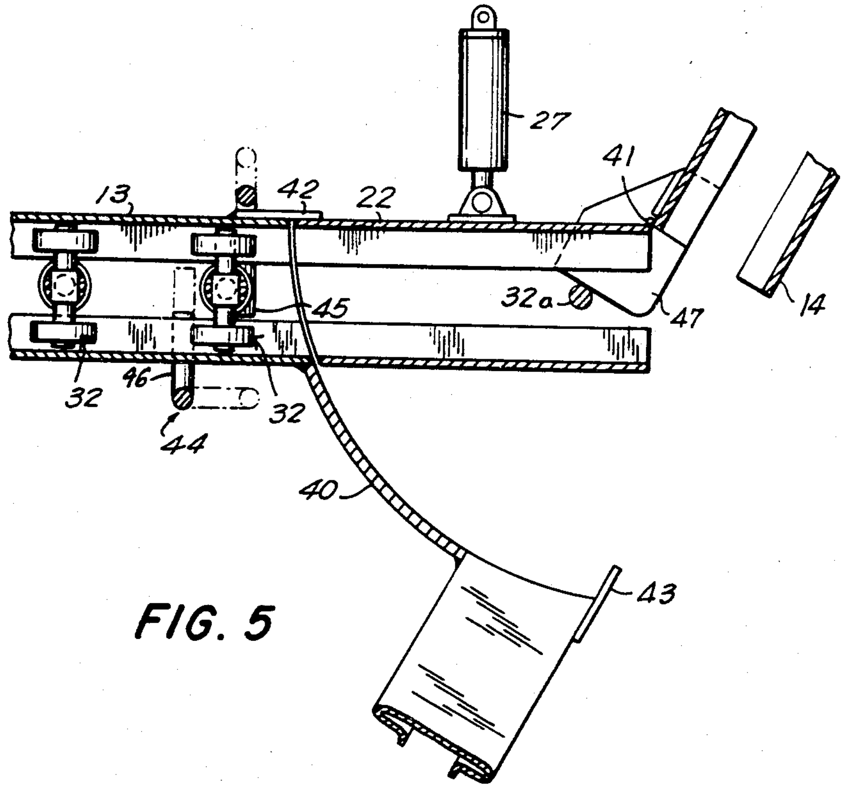
FIG. 5 is an enlarged top plan view, partly broken away and in section, of a transfer or switch unit shown in FIG. 1 for transferring a carrier unit and article carried thereby from a storage line to a delivery line.
Figures 5A, 5B:
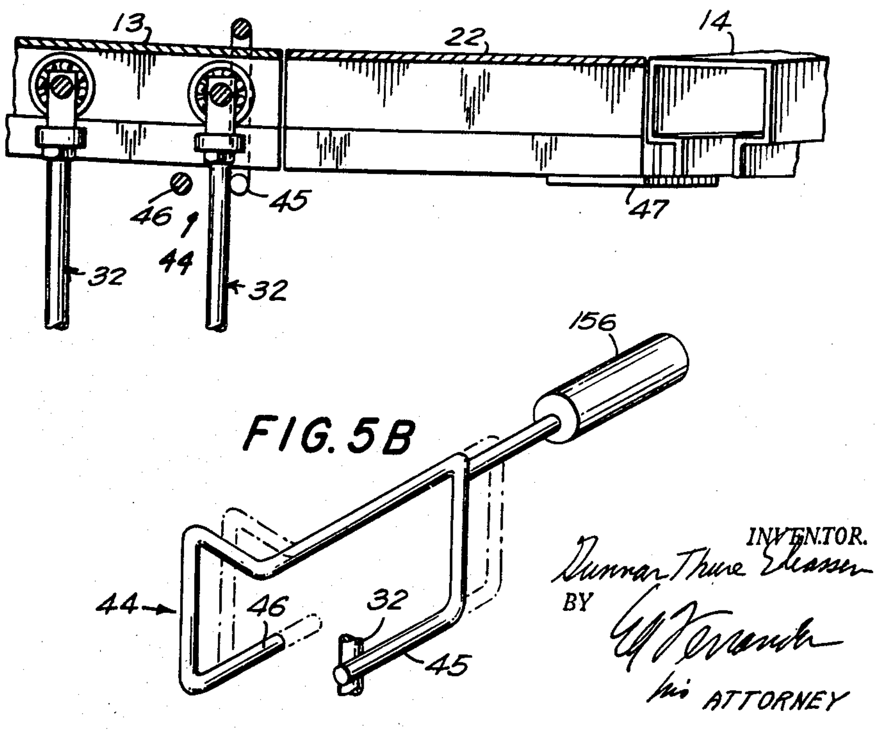
FIG. 5A is a vertical sectional view of the switch or transfer unit shown in FIG. 5.
FIG. 5B is a fragmentary perspective view of details illustrated in FIGS. 5 and 5A.

The switch or transfer unit 22 for transferring articles from one of the storage paths 13 to the article delivery line 14 is shown in FIGS. 5 and 5A. The rail 25 for the switch unit is not seen in FIG. 5 in order to illustrate a vertical reinforcing rib 40 for the rail which is of arcuate form and at the underside thereof. The switch unit 22 is horizontally disposed and pivotally mounted on the article delivery line 14 at 41 and is horizontally movable between the storage path 13 to a position where it becomes a part of the article delivery line 14 by a pneumatically operated cylinder 27. Stops 42 and 43 are provided on the storage path 13 and on the article delivery line 14, respectively, to limit movement of the switch unit 22 between its extreme end positions at the storage path and article delivery line.

The lower ends of the horizontally extending storage paths 11, 12 and 13 are provided with devices which function to stop the carrier units 32 moving horizontally downward on the paths by gravity. Such a device 44 is shown in FIGS. 5 and 5A at the lower end of the storage path 13. The device 44 is located in front of the outer extremity of the pivotally mounted switch unit 22 and functions in such manner that only one carrier unit 32 can advance onto the switch unit when it is in alignment with the storage path and forward movement of the leading carrier unit 32 on the storage passage is blocked when the switch unit 22 forms a component of the article delivery line 14 and is in alignment therewith.

As seen in FIGS. 5, 5A and 5B, the device 44 comprises rods 45 and 46 which are disposed at opposite sides of the storage path 13 and have horizontal arms movable into and out of the path of movement of the carrier units 32. In the solid line positions of the rods 45 and 46 in FIG. 5, the rod 45 is in the path of movement of the leading carrier unit 32 and blocks forward movement thereof. The rod 46 is out of the path of movement of the carrier units 32 which will permit the second carrier unit 32 to move forward on the storage path until it is stopped by the leading carrier unit 32.

When the switch unit 22 is in the position shown in FIG. 5 and it is desired to transfer the leading carrier unit 32 from the storage path to the article delivery line 14, the device 44 is actuated whereby the rod 45 is retracted to a position out of the path of movement of the leading carrier unit 32, as indicated by the dotted lines in FIGS. 5 and 5B, thereby permitting the leading carrier unit to advance by gravity onto the switch unit 22. At the same time the rod 45 is retracted out of the path of movement of the leading carrier unit 32, the rod 46 is moved to the dotted line position in FIGS. 5 and 5B between the leading carrier unit and the carrier unit behind it, thereby preventing forward movement of the second carrier unit on the storage path. The rod 46 can move to its dotted line position in FIGS. 5 and 5B because the first and second carrier units are separated by the holder 39 and ball bearing 38 carried by one of the carrier units and extending toward and engaging the other of the carrier units.

After the leading carrier unit 32 has advanced onto the switch 22, the device 44 can be actuated to return rod 45 to its solid line position in FIGS. 5 and 5B, after which the rod 46 can be retracted to its solid line position, whereby the second carrier unit 32 can move forward on the storage path 13 until it is stopped by the rod 45. Although I have not shown mechanism for actuating the rods 45 and 46 in and out of the path of movement of the carrier units 32 in the manner just described, it will be understood that the device 44 can be operated pneumatically by compressed air in a manner which will be described hereinafter, and that the rods 45 and 46 may form components of a single control operable to impart back and forth movement to the rods.

A stationary plate 47 is provided at the zone the switch unit 22 is pivotally mounted at 41 on the article delivery line 14. As shown in FIG. 5, the carrier unit 32 advancing onto the switch unit 22 strikes a forward edge of the plate 47 which is inclined at an acute angle to the direction of movement of the carrier unit. In FIG. 5 the forward part of the carrier unit is indicated schematically at 32*a* to illustrate more clearly the forward edge of the plate 47 contacted by the carrier unit. When the switch unit 22 is moved about its pivot at 41 to transfer the carrier unit thereon to the article delivery line 14, the carrier unit will slide over the forward edge of the blocking plate 47 and eventually will clear the blocking plate when the switch unit is in its position against the stop 43 and forms a component of the article delivery line. When this occurs, one of the members 23 on the belt 24 becomes operable to propel the transferred carrier unit 32 on the article delivery line 14, the upper end of the vertical rod 33 of the carrier unit being in the path of movement of the one member 23 whereby the latter propels and moves the carrier unit along the article delivery path.

FIG. 6 diagrammatically represents control provisions and an electrical circuit therefor for controlling the movement of articles on the article receiving line 10 and the selective transfer or switching of the articles therefrom to the storage paths or lines 11 and 12, the storage path 13 being omitted since it is not necessary for an understanding of the invention. In FIG. 6 it will be seen that the roller 20 of the dispatching unit 17 is driven by an endless belt 18 from the roller 19, as previously explained. The dispatching unit 17 is of a type to which punched cards can be fed to cause the switch units 16 to function in a selective manner to transfer articles from the article receiving line 10 to the storage paths. Each punched card fed to the dispatching unit 17 includes dispatching information which functions to cause the control mechanism to operate in a particular manner, whereby a particular switch unit 16 becomes operable to selectively transfer a designated article automatically from the article receiving line 10 to a particular storage path.

The dispatching unit 17 comprises a plurality of rollers 48, 49, 50, 51 and 52 which are horizontally spaced from one another, the roller 48 being driven by the roller 20 over which the endless belt 18 passes. An endless chain 53 driven by the roller 48 is employed to drive the rollers 49, 50, 51 and 52. With this arrangement all of the rollers 48, 49, 50, 51 and 52 are driven at the same peripheral speed and in synchronism with the belt 15.

The dispatching unit 17 includes a horizontal plate 54 which functions as a support for punched cards or other material which includes dispatching information, the gap between the plate 54 and the rollers 48, 49, 50, 51 and 52 being slightly greater than the thickness of the punched cards. At the underside of the plate 54 and in vertical alignment with the rollers 48, 49, 50, 51 and 52 are provided a second horizontal row of rollers 55, 56, 57, 58 and 59, which may be referred to as pressure rollers. The plate 54 is formed with a series of holes or openings 60, 61, 62, 63 and 64, each of which is in alignment with a pair of rollers directly opposite one another and above and below the plate, respectively. Each pressure roller is movable into the opening or hole adjacent thereto and engages or contacts the underside of a punched card and moves the card against the rollers 48, 49, 50, 51 and 52.

Each pressure roller 55, 56, 57, 58 and 59 is mounted for rotation at one end of a lever 65 which is pivoted intermediate its ends at 66. Hence, each lever 65 rocks about the pivot 66 and the pressure roller thereon is freely rotatable adjacent to one of the openings in the plate 54. The opposite end of each lever 65 is connected to an actuating member 67, such as an electrical solenoid, for example.

A contact breaker 68 in front of the first roller 48 is acted upon by a punched card when it is slid on the top surface of the plate 54 toward the gap between the plate and the first roller 48, in the direction of the arrow at the left end of the plate 54. When this occurs the punched card is moved between the first pair of rollers 48 and 55 and the second pair of rollers 49 and 56. The punched card closes the contact breaker 68. When one of the article propelling members 21 on the belt 15 becomes operable to close a contact breaker 72, a circuit will be completed from a source of electrical supply 69 through conductor 70, contact breaker 68, conductor 71, contact breaker 72, conductor 73, relay 74 and solenoid 67. When the solenoid 67 is energized it attracts one end of the lever 65 whereby the roller 55 at its opposite end is moved upward into the opening 60 against the roller 48 and the latter is rendered operable to move the punched card toward the right in FIG. 6.

Two contact breakers 75 and 76 are provided at the right side of the roller 49. The contact breaker 75 is connected by a conductor 77 with the source of electrical supply 69, such as a transformer, for example, and by a conductor 78 to a contact breaker 79 which is actuated by the members 21 on the belt 15. The contact breaker 76 is connected to the contact breaker 75 and by a conductor 80 to the relay 74. When a punched card advances on the plate 54 so that a marking hole therein moves into position in front of the contact breaker 76, this contact breaker will complete a circuit through the conductor 80 to the relay 74 and open the circuit for the solenoid 67. When this occurs the lever 65 rocks about its pivot and the pressure roller 55 moves downward, whereby the punched card stops moving. The contact breaker 72 is actuated by a member 21 and is closed until the solenoid 67 becomes de-energized and the punched card stops moving.

While the punched card is stationary and the marking hole therein is opposite the contact breaker 76, the member 21 on the belt 15 continues to move toward a contact breaker 79. The contact breaker 79 is connected to a contact breaker 81 actuated by the carrier units 32 at the end of the article receiving line 10 at which the articles are adapted to be supplied thereto in any suitable manner (not shown). The contact breaker 81 is in front of a stop 82 which functions to advance one carrier unit 32 at a time on the article receiving line 10. The stop 82 is operated by a pneumatic cylinder 83 under the control of a master air control valve 84. A solenoid-operated valve 85 is connected to the contact breaker 81 which in turn is connected by conductor 87 to the solenoid 67 associated with the pressure roller 56.

When an article propelling member 21 on the belt 15 closes the contact breaker 79 and at the same time the contact breaker 81 is closed by the action of a carrier unit 32, an electrical circuit will be completed for the solenoid-operated valve 85 and also for the solenoid 67 operatively associated with the pressure roller 56. When solenoid-operated valve 85 is energized, a pilot air control system of which the valve 85 is a part becomes operable to cause the master air control valve 84 to function to render the pneumatic cylinder 83 operable to move the stop 82 to permit a carrier unit 32 to advance on the article receiving line 10. The carrier unit 32 advanced on receiving line 10 then becomes operable to act on a pilot valve 86. The pilot valve 86 is a part of a pilot air control system which now becomes operable to cause the master air control valve 84 to function to render the pneumatic cylinder 83 operable to raise the stop 82. The member 21 on the belt 15 now becomes operable to propel a carrier unit 32 on the article receiving line 10.

As just explained, an electrical circuit will be completed through conductor 87 for the solenoid 67 when the stop 82 is actuated. When this occurs the pressure roller 56 moves upward against the roller 49 to render the latter operable to feed the punched card to the right. Under these conditions, movement of the movable member 21, which propels and moves a carrier unit 32, and movement of the punched card are synchronized.

Two contact breakers 88 and 89 are located at the right side of the drive roller 50, the contact breaker 88 being connected by the conductor 90 to the source of electrical supply 69 and by the conductor 91 to the solenoid 67 associated with the pressure roller 57. The contact breaker 88 is actuated by the front edge of the punched card and completes a circuit for the solenoid 67, whereby the lever 65 rocks about its pivot and moves the pressure roller 59 through the opening 62 in the plate 54 to force the punched card against the roller 50 and render the latter operable to drive the punched card. The contact breaker 75 opens when it is no longer acted upon by the punched card.

The contact breaker 89 is connected by the conductor 92 to the conductor 91 of the contact breaker 88 and by a conductor 93 to a contact breaker 94 at the vicinity of the article receiving line 10. The contact breaker 94, which is actuated by carrier units 32 moving on the article receiving line 10, is located immediately in front of the switch or transfer unit 16 associated with the storage path 11.

The switch unit 16 is operated by the pneumatic cylinder 27 under the control of a master air control valve 97. A solenoid-operated valve 96 is connected by conductor 95 to the contact breaker 94. When one of the carrier units 32, with one or more articles thereon, is propelled and moved on the receiving line 10 by the propelling members 21 of the belt 15 and actuates the contact breaker 94, the punched card has moved such a distance on the plate 54 that a hole or opening therein, which designates the storage path to which a carrier unit 32 is to be directed from the receiving line 10, reaches a point in the travel of the punched card which enables contact breaker 89 to be actuated. This completes a circuit for the solenoid-operated valve 96 from the contact breaker 88 through conductor 92, contact breaker 89, conductor 93, contact breaker 94 and conductor 95 to solenoid-operated valve 96. When solenoid-operated valve 96 is energized, a pilot air control system of which the valve 96 is a part becomes operable to cause the master air control valve 97 to function to render the pneumatic cylinder 27 operable to actuate the switching unit 16 to move it from a position in alignment with the receiving line 10 to a position in alignment with the storage path. The carrier unit 32 diverted from the line 10 by the switch unit 16 to the storage path 11 moves downward by gravity and on the storage path the diverted carrier unit 32 actuates a pilot valve 98. The pilot valve 98 is a part of a pilot air control system which now becomes operable to cause the master air control valve 97 to function to render the pneumatic cylinder 27 operable to move the switch unit 16 from the storage path 11 to the article receiving line 10 in alignment therewith.

The punched card in the dispatching unit 17 now has advanced on the plate 54 to the next drive roller 51 and pressure roller 58. Contact breakers 99 and 100 are located at the right side of the roller 51. These contact breakers correspond to contact breakers 88 and 89 at the right side of the drive roller 50. The contact breaker 99 is connected by a conductor 101 to the source of electrical supply 69 and by the conductor 102 to the solenoid 67 associated with the pressure roller 58. The contact breaker 100 is connected by a conductor 103 to the contact breaker 99 and by a conductor 104 to a contact breaker 105 at the vicinity of the article receiving line 10. The contact breaker 105 is connected by a conductor 106 to a solenoid-operated valve 107 which is associated with a pilot air control system and, when energized, causes a master air control valve 108 to function to render the pneumatic cylinder 27 operable to actuate the switching unit 16 at the storage path 12 to divert a carrier unit 32 to this storage path when the carrier unit actuates the contact breaker 105. After the carrier unit 32 has been diverted to the storage path 12, it actuates a pilot valve 109 which is associated with a pilot air control system and now becomes operable to cause the master air control valve 108 to function to render the pneumatic cylinder 27 operable to move the switch unit 16 from the storage path 12 to the article receiving line 10 in alignment therewith.

The contact breaker 99 is actuated by the front edge of the punched card and completes a circuit for the solenoid 67, whereby the pressure roller 58 at the end of lever 65 moves through the opening 63 to force the punched card against the drive roller 51 and render the latter operable to drive the punched card. Let us assume that a carrier unit 32 on the line 10 has actuated the contact breaker 105. If no marking hole in the punched card is located at the contact breaker 100 to enable it to be actuated at the same time that contact breaker 105 is actuated, the air cylinder 27 is not rendered operable to move the switching unit 16 to shift or transfer the carrier unit 32 from the line 10 to the storage path 12 and the carrier unit 32 will continue to move on the article receiving line 10. If a marking hole in the punched card is located at the contact breaker 100 at the same time that contact breaker 105 is actuated, thus permitting contact breaker 100 to be actuated, the pneumatic cylinder 27 will be rendered operable to move the switch unit 16 from the line 10 to the storage path 12 in the same manner that a carrier unit 32 is diverted to storage path 11, as explained above.

Two contact breakers 110 and 111 are located at the right side of the drive roller 52. A pressure roller 59 cooperates with the drive roller 52 through an opening 64 in the plate 54. The contact breaker 111 is operatively associated with parts (not shown), which are like the parts 94 to 98 and 105 to 109 described above, for operating a switch unit 16 associated with the storage path 13 for diverting thereto carrier units 32 moving on the receiving line 10. The number of cooperating drive rollers and pressure rollers and control provisions associated therewith which are necessary will, of course, depend upon the number of storage paths embodied in the conveyor system.

FIG. 7 diagrammatically represents control provisions and an electrical circuit therefor for controlling the selective transfer or switching of articles from the storage paths 12 and 13 to the article delivery line 14, the storage path 11 being omitted since it is not necessary for an understanding of the invention. A dispatching unit 120 operated by punched cards is employed to selectively operate the switches 22 for transferring carrier units 32 from the storage paths to the delivery line 14. The dispatching unit 120 comprises a plurality of contact breakers 121, 122 and 123 past which punched cards are fed from right to left, as indicated by the arrow in FIG. 7.

The dispatching unit 120 also includes a contact breaker 126 which is actuated when a punched card is fed to the unit. The contact breaker 126 is connected by a conductor 127 to a source of electrical supply 128, a manually operable switch 129 being provided on the conductor 127. The contact breaker 126 is connected by a conductor 131 to a motor 130 and arranged to drive a roller 134, and by a conductor 133 to a solenoid 132 operatively connected to one end of a lever 136 which is pivoted intermediate its ends and to the other end of which a pressure roller 135 is mounted for rotation thereon.

The contact breaker 126 completes a circuit for the motor 130 and solenoid 132 and connects one side of the contact breakers 121, 122 and 123 to the source of electrical supply 128 responsive to feeding of a punch card to the dispatching unit 120. The pressure roller 135 forces the punched card against the driving roller 134 and renders the latter operable to move the punched card to the left. The punched cards are provided with holes which may be referred to as dispatching information to cause the switch units 22 to function in a selective manner to transfer articles from the storage paths to the delivery line 14. The contact breakers 121, 122 and 123 are connected by conductors 138, 139 and 140 to controls which are associated with the switch units 22 for the storage paths 11, 12 and 13, respectively, and will now be described.

Let us assume that the punched card fed to the dispatching unit 210 is provided with a hole which enables the contact breaker 121 to complete a circuit to initiate operation of the switch unit 22 for the storage path 13, such circuit including the conductor 140. While the switch unit 22 for the storage path 13 is diagrammatically shown in alignment with the storage path and moved from the article delivery line 14 in FIG. 7, let us assume for the moment that this switch unit forms a component of the article delivery line 14 and is in alignment therewith. In such case, the switch unit 22 actuates contact breaker 142 which is connected by the conductor 140 to the contact breaker 121 of the dispatching unit 120. A manual contact 143 is provided in the conductor 140 which permits an operator to by-pass the dispatching unit 120 and connect conductor 140 directly to the source of electrical supply 128 to operate the switch unit 22 in the event this becomes necessary.

The contact breaker 142 is connected by a conductor 144 to a solenoid-operated valve 145 to complete a circuit which is closed when contact breaker 142 is actuated by the switch unit 22 when it forms a part of the delivery line 14. The solenoid-operated valve 145 is associated with a pilot air control system and, when energized, causes a master air control valve 146 to function in a manner which will be described presently. The master air control valve 146 is connected by a conduit 148 to a master air power source through which the flow of high pressure air is controlled by a valve 149 which is actuated at the proper time by a member 23 on the belt 24. Let us assume that one of the members 23, which may be propelling and moving a carrier unit 32 on the article delivery line 14, is moving onto the switch unit 22 forming a component of the delivery line. Under these conditions it is not desirable to shift the switch unit 22 from the delivery line 14 to the storage path 13 even when the contact breaker 121 of the dispatching unit 120 is rendered operable to connect conductor 140 to the source of electrical supply 128. Accordingly, the control valve 149 remains closed and renders master control valve 146 ineffective when a propelling member 23 is approaching and moving onto a switch unit. However, when the member 23 passes a switch unit 22 it acts upon a lever 150 which may be the same length as a switch unit 22. When this occurs control valve 149 opens and high pressure air can flow to the master air control valve 146, and, assuming that solenoid-operated valve 145 is energized, the master control valve 146 will function to render the pneumatic cylinder 27 operable to shift the switch unit 22 from the article delivery line 14 to a position in alignment with the storage path 13, as diagrammatically shown in FIG. 7.

When the switch unit 22 is moved to a position in alignment with the storage path 13, a contact breaker 151 is actuated which completes an electrical circuit to initiate operation of control mechanism to operate the stop device 44 shown in FIGS. 5, 5A and 5B and described above. The contact breaker 151 is connected by a conductor 152 to the source of electrical supply 128, and by a conductor 153 to a solenoid-operated valve 154 which is associated with a pilot air control system and, when energized, causes a master control valve 155 to function to render the pneumatic cylinder 156 operable to actuate the stop device 44. When this occurs the rod 45 will be retracted from its position in the path of movement of the leading carrier unit 32 on the storage path 13, as indicated by the dotted lines in FIGS. 5 and 5B, and permit the leading carrier unit 32 to move by gravity and advance onto the switch unit 22. At the same time that rod 45 is retracted the rod 46 of the stop device 44 is moved inward to its dotted line position in FIGS. 5 and 5B to hold back the carrier unit 32 behind the leading carrier unit 32.

In the retracted position of the rod 45 of the stop device 44, the latter actuates a contact breaker 161 which is connected by a conductor 162 to the source of electrical supply 128, and by a conductor 160 to a solenoid-operated valve 159. The solenoid-operated valve 159 is associated with a pilot air control system and, when energized, causes the master control valve 155 to function to render the pneumatic cylinder 156 operable to cause the rod 45 of the stop device 44 to become effective to stop movement of the leading carrier unit 32 on the storage path 13. After the rod 45 is moved into the path of movement of the leading carrier unit the rod 46 is retracted from its dotted line to its solid line position shown in FIGS. 5 and 5B.

When the leading carrier unit 32 advances on the switch unit 22 it actuates a contact breaker 163 connected by a conductor 164 to the source of electrical supply 128 and by the conductor 165 to a solenoid-operated valve 166. The solenoid-operated valve 166 is associated with a pilot air control system and, when energized, causes master air control valve 146 to function to render the pneumatic cylinder 27 operable to move the switch unit 22 from its position at the storage path 13 to its position at the article delivery line 14 where it forms a component thereof.

In order to prevent carrier units 32 moving on the article delivery line 14 from falling into an open space therein when a switch unit 22 has been moved from the delivery line to a position at which it cooperates with a storage path, I provide a first contact breaker 168 in front of a switch unit 22 and a second contact breaker 169 in the open space in the delivery line 14 which becomes effective when the switch unit 22 has been moved therefrom to cooperate with a storage path. The contact breaker 168 is connected by a conductor 170 to the source of electrical supply 128, and by a conductor 171 to the second contact breaker 169 which in turn is connected by a conductor 172 to a coil of a relay 173 which connects to a source of electrical energy a motor 174 for driving the belt 24 to which the propelling members 23 are fixed. When a carrier unit 32 actuates the contact breaker 168 and the switch unit 22 has been moved from the delivery line 14 to form an open space therein, a circuit will be completed through contact breaker 168 and the contact breaker 169, which is normally closed when the switch unit 22 has been moved out of the delivery line 14, to energize relay 173 and cause the latter to open the circuit to the motor 174. When the switch unit 22 moves back to its closed position in the deliivery line 14, the contact breaker 169 opens and renders relay 173 ineffective to disconnect the motor 174 from its source of electrical energy.

Another contact breaker 175 is located in the open space in the delivery line 14 which becomes effective when the switch unit 22 has been moved to cooperate with the storage path 13. The contact breaker 175, which is closed when the open space in the delivery line 14 is formed and open when the switch unit 22 is moved to close the open space and form a component of the delivery line 14, is connected by a conductor 176 to the source of electrical supply 128 and by a conductor 177 to a signal lamp 178. Therefore, a circuit will be completed for the lamp 178 only when the switch unit 22 has been moved to a position in which it cooperates with the storage path 13. Alternatively, the contact breaker 175 can be connected by a conductor 179 to the conductor 135 of the circuit for the solenoid 132. With this arrangement the solenoid 132 will be rendered ineffective to move the pressure roller 135 against the drive roller 134 and the latter cannot function to move punched cards in the direction of the arrow when the switch unit 22 has been moved from the delivery line 14 and the contact breaker 175 closes to complete a circuit through conductor 179. When this occurs the solenoid 132 is short-circuited and the dispatching unit 120 is rendered inoperable.

Figure 8:
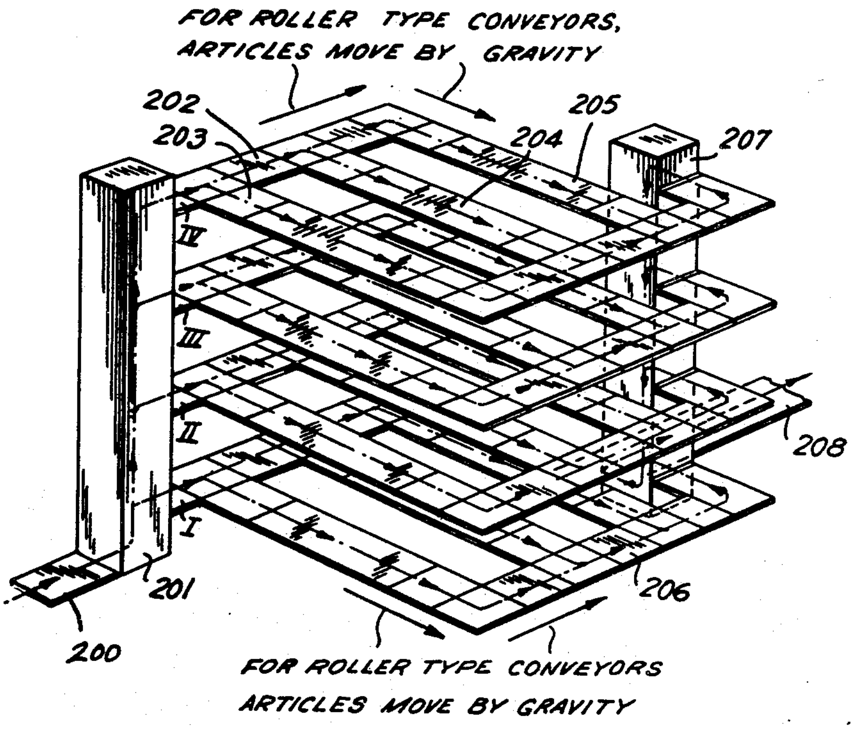
FIG. 8 is a diagrammatic perspective representation of a conveyor system having components at a plurality of different levels and elevators for raising and lowering articles to and from the different levels.
Figures 9, 9A, 9B:
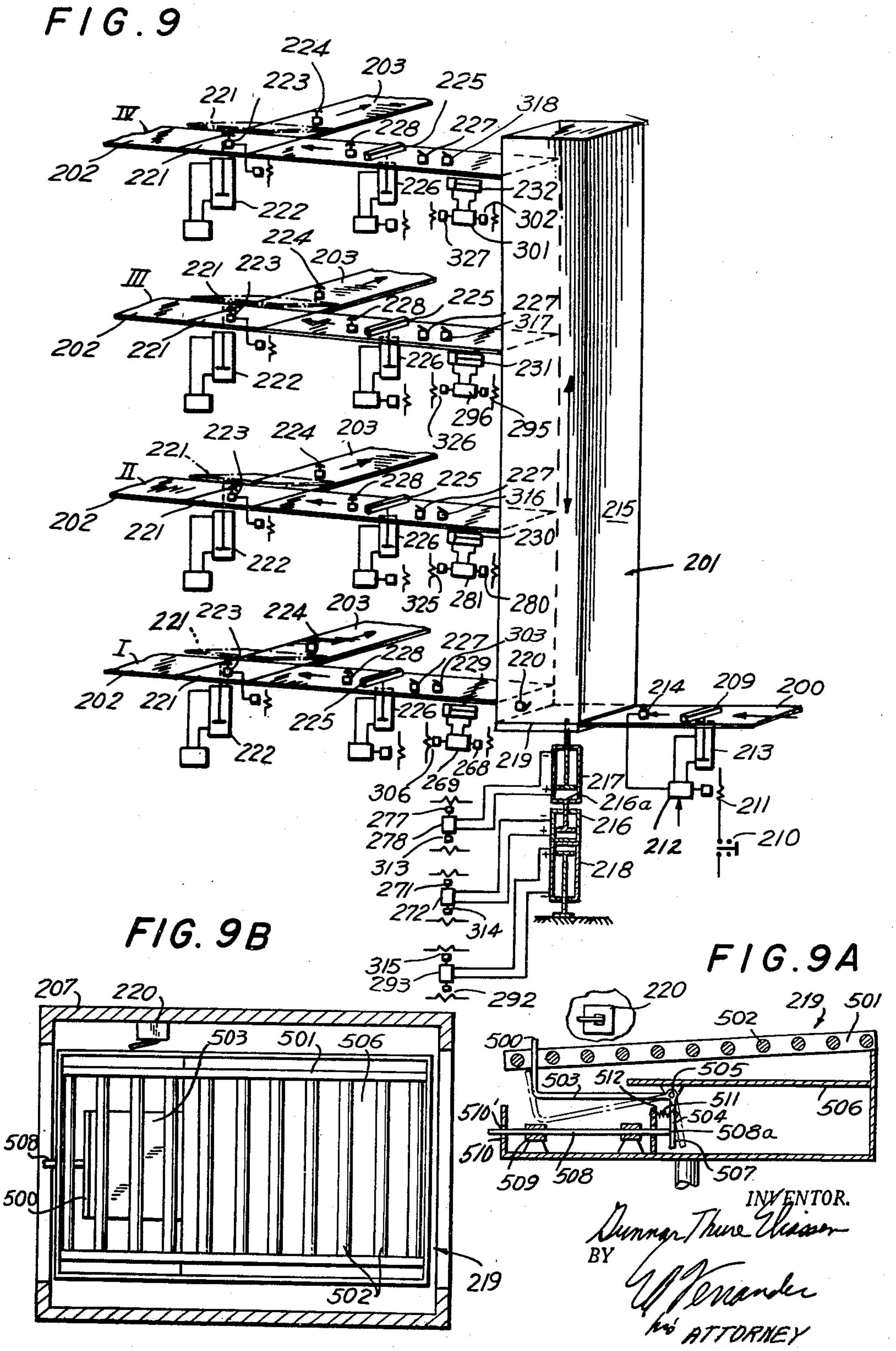
FIG. 9 is a diagrammatic representation of the control provisions for feeding articles and distributing the articles at the different levels of the conveyor system shown in FIG. 8.
FIGS. 9A and 9B are vertical sectional and top plan views, respectively, schematically illustrating the elevator platform shown in FIG. 9.
Figure 11:
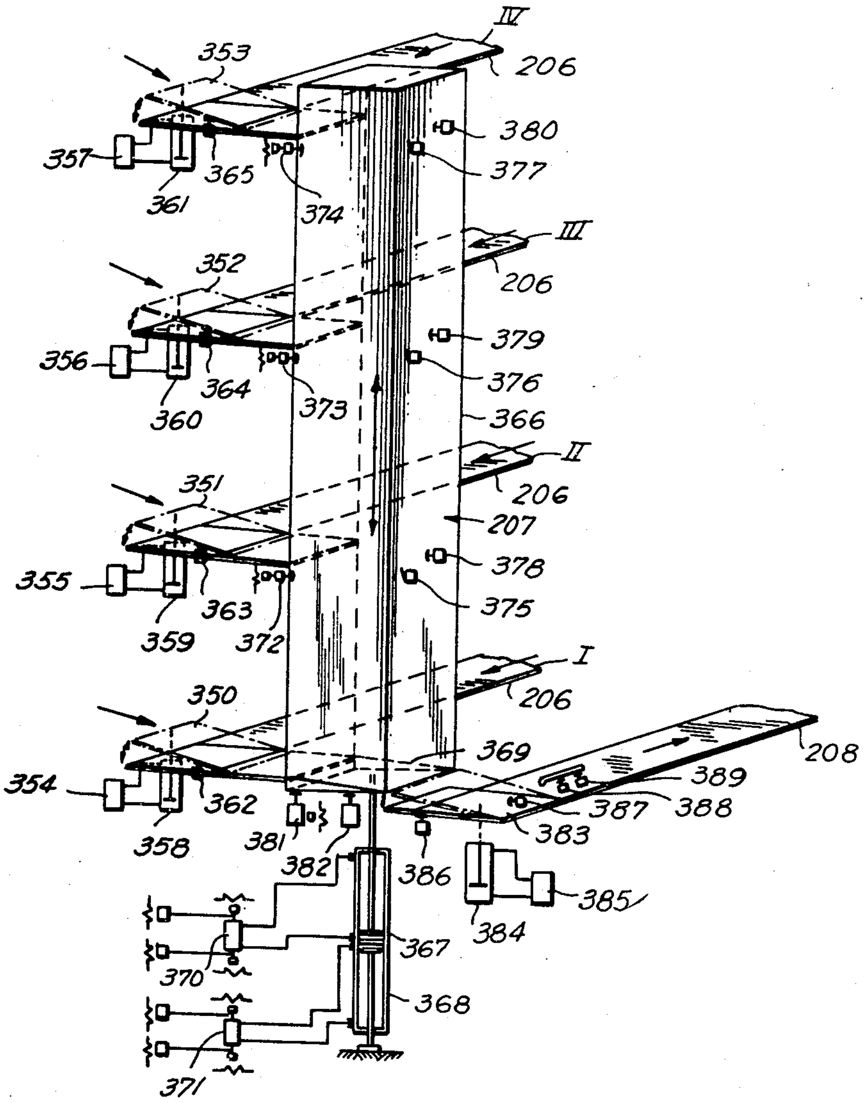
FIG. 11 is a diagrammatic representation of the controls for transferring the distributed articles to delivery paths at the different levels of the conveyor system shown in FIG. 8 and lowering the articles by the same elevator from the different levels.

In FIGS. 8, 9 and 11 I have diagrammatically illustrated another form of the invention in which the articles received by a feed path 200 are intended to be supported at their bottoms and moved to an elevator or lift 201 in which the articles can be raised to any one of four different levels I, II, III and IV. At each level the articles pass from the elevator to an article receiving path or line 202 from which the articles can be transferred or diverted to any one of three storage paths 203, 204 and 205. In the arrangement illustrated in FIGS. 8, 9 and 11 it will be understood that any number of storage paths may be provided.

At each different level the articles are transferred from the storage paths 203, 204 and 205 to an article delivery path or line 206 for moving the articles to an elevator or lift 207. All of the articles are lowered in the elevator 207 to the same level and moved on a discharge path or line 208.

It will be understood that FIG. 8 is a schematic representation of a complete storage system arranged to receive and store articles moving toward the elevator or lift 201 on the feed path 200 and to deliver articles on the discharge path 208 from the elevator or lift 207. Further, many of the details shown in FIGS. 9 and 11 have been omitted from FIG. 8 for sake of clarity.

In FIG. 9 I have shown a diagrammatic representation of the feed path 200, elevator 201, article receiving lines 202, and storage paths 203 seen in FIG. 8. The feed path 200 is of the roller conveyor type which is inclined downward toward the elevator and over which articles move by gravity and come to rest against a stop 209 in front of the elevator 201. The stop 209 is vertically movable and can be lowered by mechanism which includes a solenoid-operated valve 211.

As shown in FIG. 9, the electrical circuit for the solenoid-operated valve 211 is completed by a manually operable switch 210. The solenoid-operated valve 211 is associated with a pilot air control system and, when energized, causes a master air control valve 212 to function to render a pneumatic cylinder 213 operable to lower the stop 209 downward between adjacent rollers of the conveyor out of the path of movement of the article. The article previously held against the stop 209 now can advance toward the elevator 201 and during such forward movement acts on a pilot valve 214. The pilot valve 214 is a part of a pilot air control system which now becomes operable to cause the master air control valve 212 to function to render the pneumatic cylinder 213 operable to raise the stop 209 against which the next article will come to rest.

The lift or elevator 201 comprises a platform 219 which can be displaced at different levels I, II, III and IV in an elevator shaft 215 by pneumatic cylinders 216, 217 and 218. A contact breaker 220 is actuated by the articles after introduction onto the platform 219. At each level I, II, III and IV, an article receiving line or distributing path 202 extends from the elevator 201. From the respective distribution paths, there extend storage paths, only one of which, designated 203, is shown at each level. To each storage path 203 the articles are transferred from the distribution path 202 by switch units 221 which in solid lines are shown in closed position and in dotted lines are shown in open position for transferring articles onto the storage paths.

The switch units 221 are like those disclosed in my application Ser. No. 228,522, filed Oct. 5, 1962, now Patent No. 3,173,557, granted Mar. 16, 1965, which employ valves similar to valves 223 and 224 which are adapted to be actuated by articles at the switch units 221 and at the storage paths 203, respectively, to control the opening and subsequent closing of the switch units. Further, a dispatching unit like that disclosed in my application Ser. No. 228,522, now Patent No. 3,173,557, can be employed with the switch units 221 to selectively transfer articles from the article receiving lines 202 to the storage paths 203. With a dispatching unit of this type it is desirable to employ a stop 225 in each path of movement of the articles which is actuated by a pneumatic cylinder 226, and to provide a valve 228 beyond the stop 225 and also an electric switch arranged to synchronize the starting of the operation of the dispatching unit and the movement of the article on the article receiving line. Therefore, the disclosure in my application Ser. No. 228,522, now Patent No. 3,173,557, may be considered as being incorporated in this application, and, if desired, reference may be made thereto for a detailed description of the switch units and dispatching unit.

However, I have illustrated in FIGS. 13 to 20 that part of the disclosure of Patent No. 3,173,557 which shows the manner in which articles delivered from the elevator or lift 201 to the article receiving lines 202 are transferred therefrom to the several storage paths 203 to 205. Each of the conveyors functioning as an article receiving line 202 operates over end rollers 621 and 622 which may be driven by an electric motor 623 having a shaft 623*a* arranged to drive the end roller 622.

The automatic transfer of articles from each of the receiving conveyors 202 to particular storage paths 203, 204 and 205 is effected with the aid of a driven control unit 628 which is driven in synchronism with the conveyor 202 and actuated through speed reduction mechanism 630 from a shaft 643 of end roller 621 of the receiving conveyor. The driven control unit 628 exercises control over the stop 225 which can be moved into and out of the path of movement of articles on the receiving conveyor 202.

The articles can be selectively transferred by switching units 221 from the conveyor 202 to the storage paths 203 to 205. Articles, such as boxes, pallets or the like, for example, are delivered to the article receiving conveyor 202 from the platform 219 of the elevator or lift 201. Each article is automatically transferred from the article receiving conveyor 202 to a selected storage path 203, 204 or 205 by depressing on a control panel 626 a particular operating member 627 corresponding to the particular storage path selected, three such operating members being provided on the control panel 626.

Figure 13:
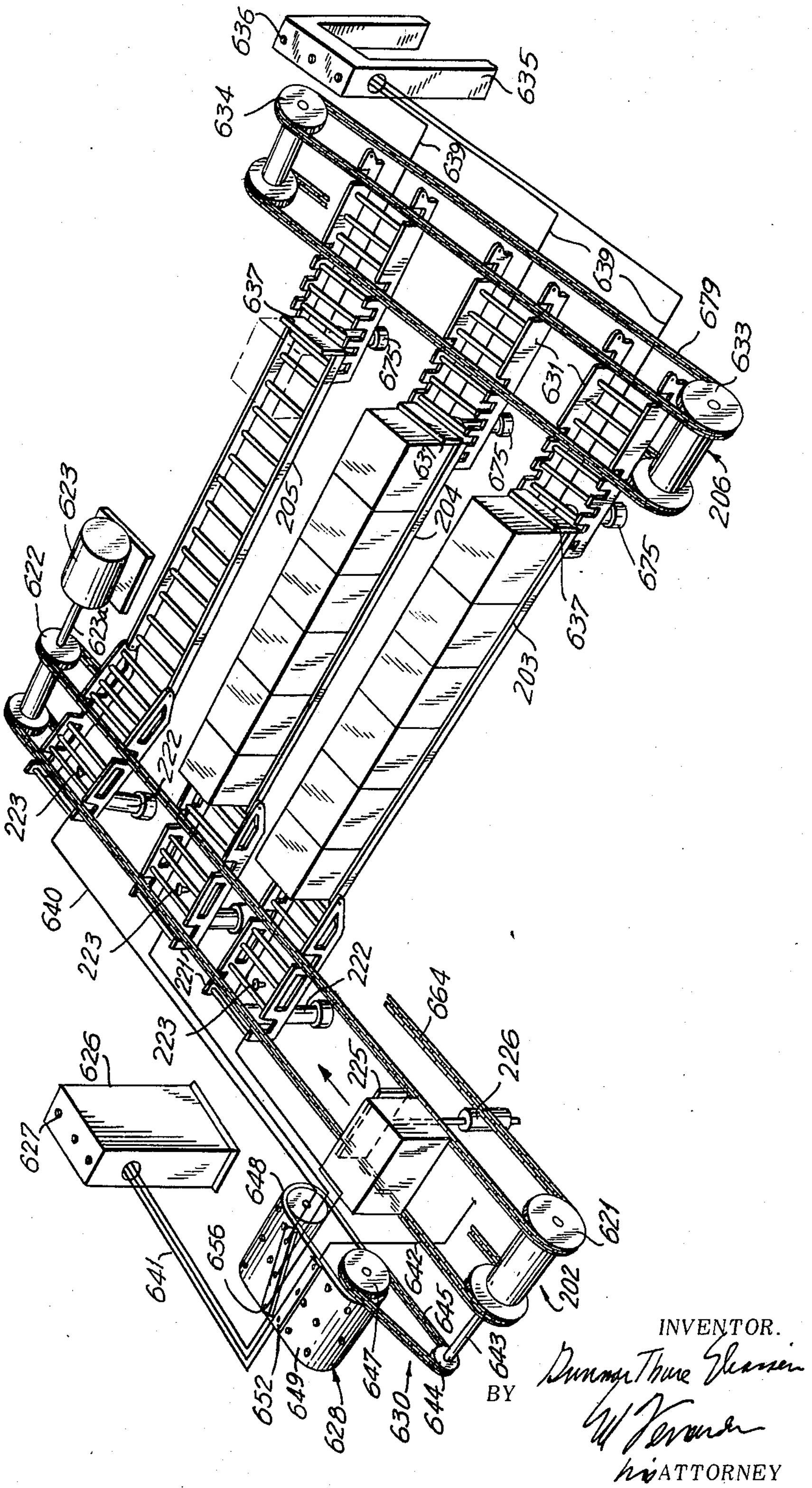
FIG. 13 is a perspective view diagrammatically illustrating one of the conveyor components shown in FIGS. 8 and 9 for distributing articles at the different levels of the conveyor system and control features associated therewith.

In FIG. 13 an article on the receiving conveyor 202 is shown positioned in front of the stop 225. As will be explained presently, depressing the operating member 627 corresponding to the third storage path 205 renders the driven control member 628 operable to effect downward movement of the stop 225 out of the path of movement of the article adjacent thereto and allows the article to be transported on the conveyor 202 to a zone opposite the third storage path 205, at which time the transfer or switching unit 221 at such zone becomes operable to raise the article from the conveyor 202. From its raised position indicated in FIGS. 13 and 14, the article moves by gravity onto the third storage path 205.

Figure 15:
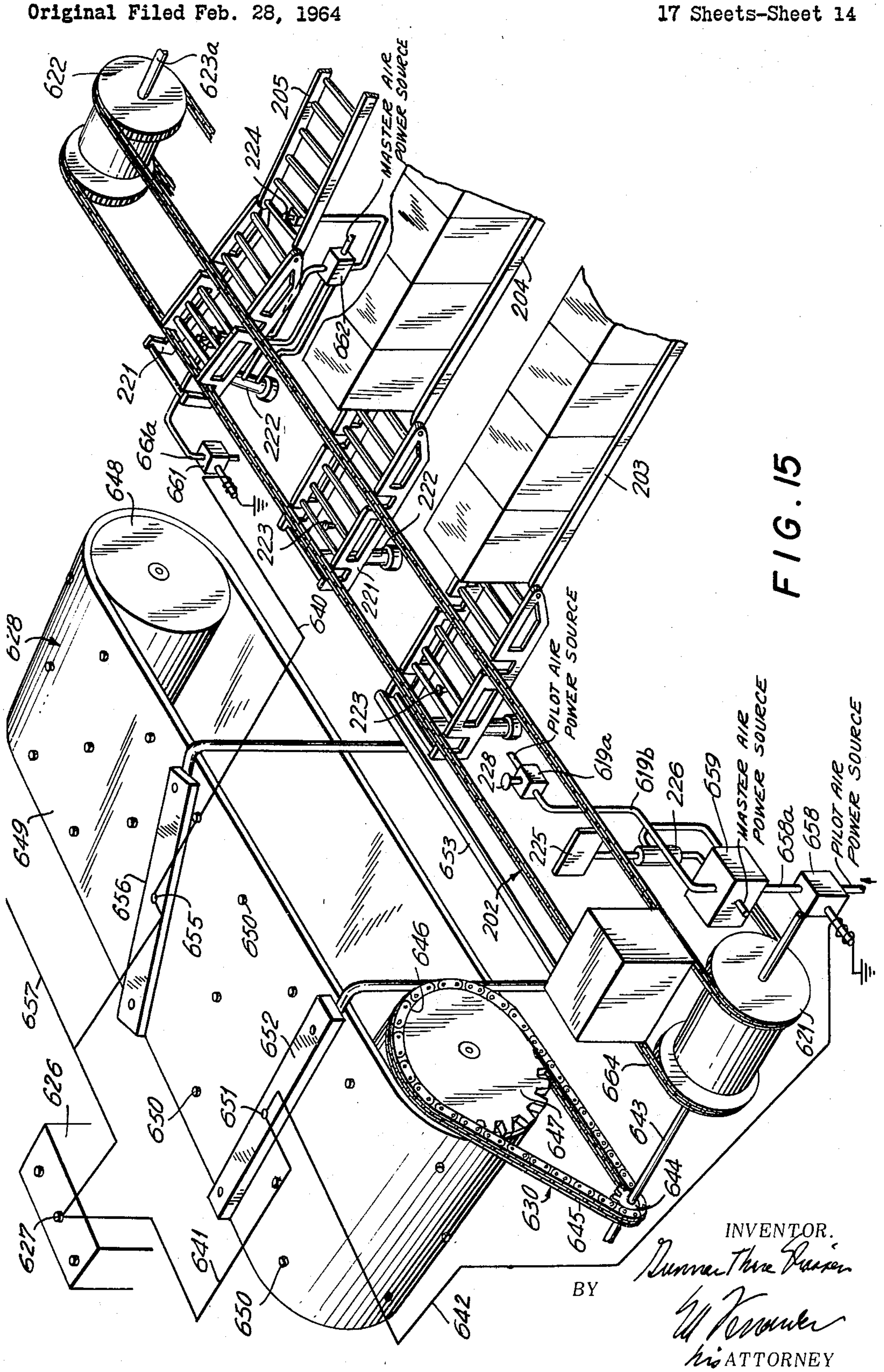
FIG. 15 is an enlarged fragmentary view of parts shown in FIGS. 13 and 14 and diagrammatically illustrates further control features.

As seen in FIG. 15, the speed reduction mechanism 630 for actuating the driven control unit 628 includes an endless chain 645 which travels over a small sprocket wheel 644 fixed to a shaft 643 of end roller 621 and a chain sprocket wheel 646 which drives a roller 647. Hence, the speed reduction mechanism 630 drives the control unit 628 at a speed which is less than that at which the receiving conveyor 202 is driven. The driven control unit controls an endless belt 649 which travels over the end roller 647 and another end roller 648 which have the same diameter.

Figures 18, 19:
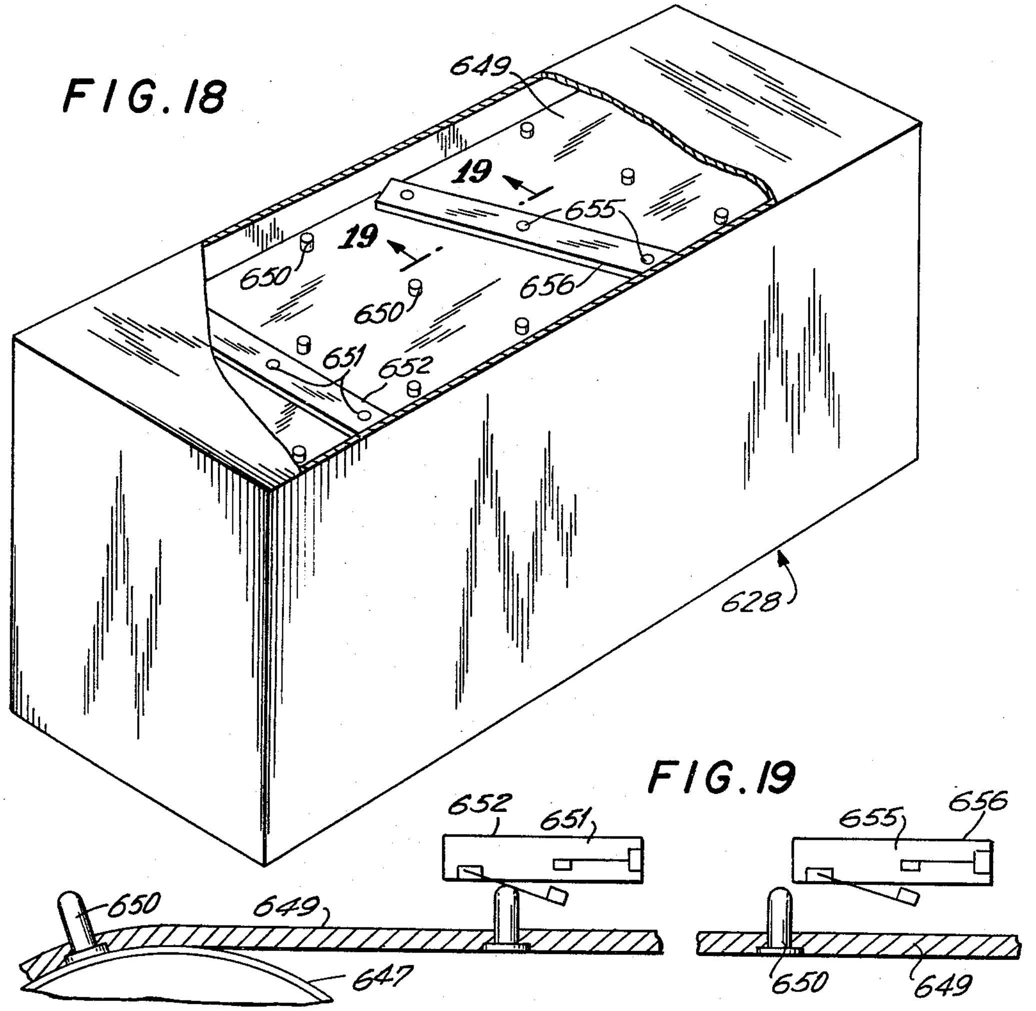
FIG. 18 is an enlarged fragmentary view, partly broken away, of parts shown in FIGS. 13, 14 and 15.
FIG. 19 is a fragmentary sectional view, partly broken away, taken at line 19—19 of FIG. 18.

As best seen in FIGS. 18 and 19, the belt 649 is provided with a number of upstanding members or pins 650 which function as movable switch actuating members and are arranged in spaced parallel rows lengthwise of the belt, the number of rows of pins 650 corresponding to the number of storage paths 203, 204 and 205 in the system, which, in the embodiment illustrated and being described, is three.

Referring to FIGS. 15, 18 and 19, it will be seen that two groups of three electrical switches 651 and 655 are disposed in the paths of movement of the pins 650 and arranged to be actuated when contacted by one of the pins 650. The switches 651 and 655 are mounted in holders 652 and 656 which extend above and transversely of the belt 650 and are supported by upright arms of a frame 653. The switch holder 652 is normal to the travel of the belt 649 from left to right, while the switch holder 656 extends obliquely across the belt. Hence, a particular pin 650 moving from left to right in FIG. 15 will first actuate the switch 651 and thereafter actuate a switch 655.

The pins 650 are displaced lengthwise of the belt 649 with respect to each other and to the switches 651 and 655 so that only one switch can be actuated at a time. The distance between the pins 650 in each row corresponds to the frequency at which the articles travel on the receiving conveyor 202, and the distance between the switches 651 and 655 for each storage path 203, 204 and 205 is proportional to the distance between the stop 225 and the particular switching unit 221 over which the switch 655 exercises control.

In FIG. 15 electrical circuits are shown in which the switches 651 and 655 for the third storage path 205 are connected. It should be understood that the electrical circuits for the other switches 651 and 655 are the same as those for the switches 651 and 655 now to be described. When the operating member 627 for the third storage path 205 is depressed and the switch 651 for the same storage path is closed by a pin 650, an electrical circuit will be completed from a source of electrical energy through a conductor 657, the operating member 627, conductor 641, switch 651 for the third storage path 205, conductor 642 and solenoid-operated pilot control valve 658 to ground. The solenoid operated valve 658 forms a part of a pilot air control system 658a for controlling flow of compressed air from a pilot air source to a master control valve 659 which is arranged to supply compressed air from a master air power source either to the space above or below a piston in air cylinder 226. When energized, the solenoid-operated pilot control valve 658 functions to effect downward movement of the piston in cylinder 226 to which is connected the stop 225, whereby the stop 225 will be moved to a position out of the path of movement of an article on the receiving conveyor 202.

Figure 20:
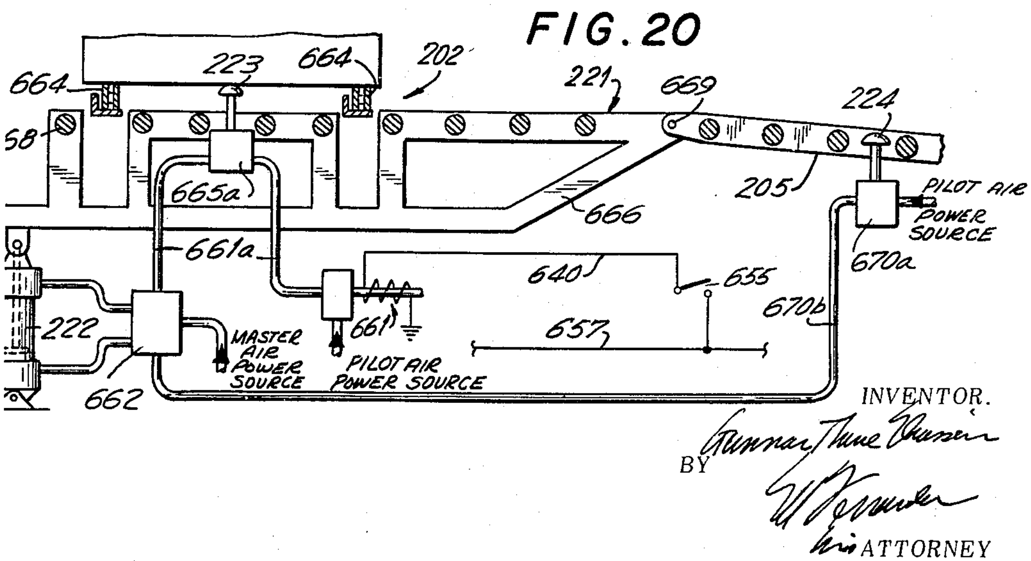
FIG. 20 diagrammatically illustrates parts shown in FIGS. 13 and 15 and additional control features.

As seen in FIG. 15, the switch 655 for the third storage path 205 is connected to the conductor 657 and also by a conductor 640 and a solenoid-operated pilot valve 661 to ground. The solenoid-operated valve 661 forms a part of a pilot air control system 661*a*, as shown in FIG. 20, for controlling flow of compressed air from a pilot air source to a master control valve 662 which is arranged to supply air from a master air power source either to the space above or below the piston in air cylinder 222. Under certain conditions that will be explained presently, solenoid-operated pilot control valve 661 when energized functions to effect upward movement of the piston in cylinder 222 which is connected to the transfer or switching unit 221 for the third storage path 205, whereby the switching unit 221 will be moved to its raised position.

Figure 16:
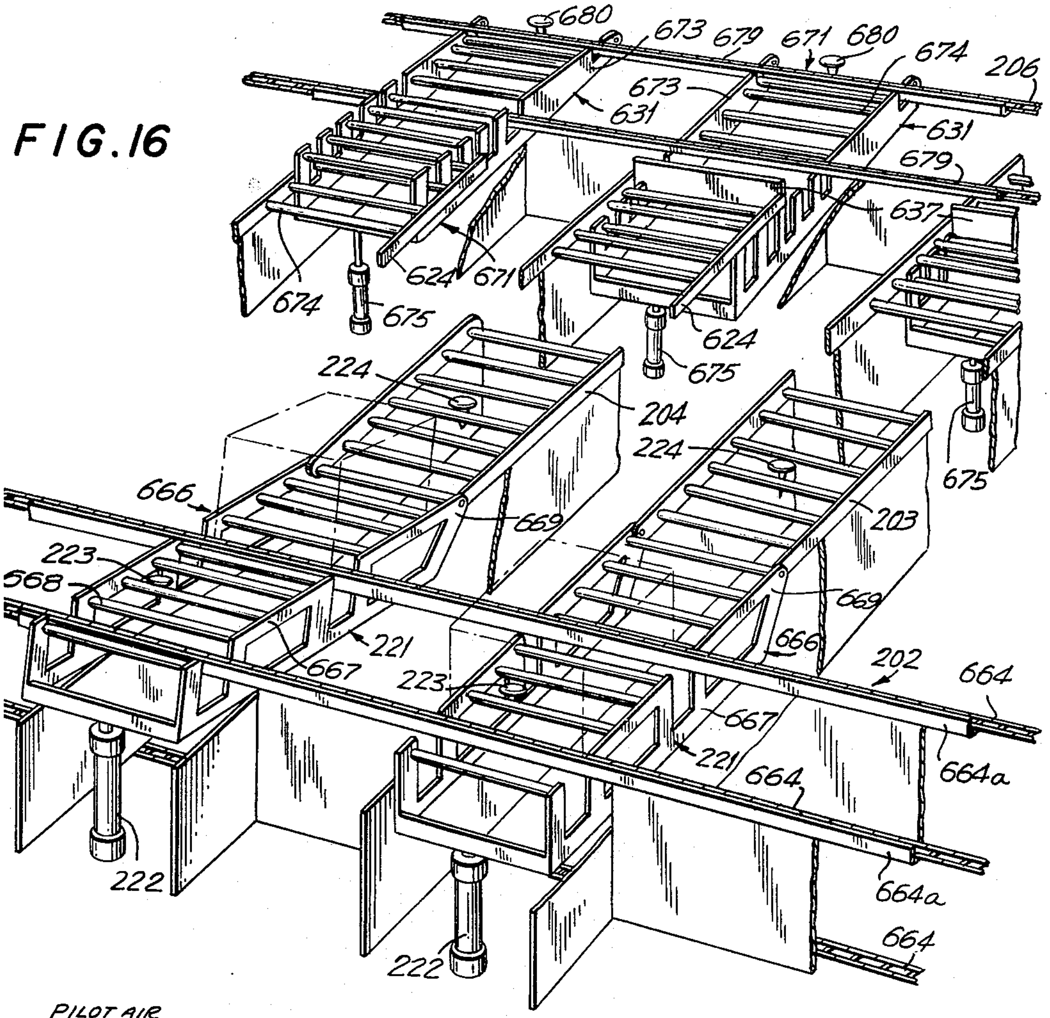
FIGS. 16 and 17 are enlarged fragmentary views of parts shown in FIGS. 13 to 15.

Referring to FIGS. 16 and 20, it will be seen that the storage paths 203, 204 and 205 comprise suitable frame structure having stationary rollers in spaced relation. The receiving conveyor 202 comprises pairs of spaced apart endless chains 664. The end rollers for the chain conveyors comprise spaced sprocket wheels, one pair of which is shown at 621 in FIG. 17. The portions of the endless chains 664 traveling from right to left in FIGS. 16 and 17 ride in elongated members 664*a* and extend vertically above such members.

As shown in FIG. 20, an article is supported by the spaced chains 664 of the receiving conveyor 202. Beneath the article and spaced from parts of the switching unit 221 is located a button 223 which is acted upon by the article and may be referred to as a pneumatic control member. The button 223 forms a part of a button-operated pilot control valve 665*a* connected in the pilot air control 661*a*, as shown in FIG. 20. When the solenoid-operated pilot valve 661 is energized responsive to closing of its associated switch 655 and the button-operated pilot control valve 665*a* simultaneously is acted upon by the article, the pilot air control system 661*a* becomes operable to cause the master control valves 662 to function to effect upward movement of the piston in cylinder 222 and raise the switching unit 221 connected thereto.

Referring to FIG. 16, each transfer or switching unit 221 comprises a frame 666 having spaced sides 667 in which the opposite ends of rollers 668 are fixed. Each switching movement 221 is pivotally connected at 669 to a different one of the storage paths 203, 204 and 205. At its opposite outer end each switching movement 221 is connected to the vertical movable piston of one of the cylinders 222 which is pneumatically operated by compressed air, as previously explained. Portions of the spaced sides 667 are recessed or notched to permit the rollers 668 of the frame 666 to be raised above the chain conveyor 664 as best seen in FIG. 16. In such raised position of the frame 666 an article will travel by gravity over the rollers 668 onto the rollers defining the storage path 205. At the article receiving end of each storage path 203, 204 and 205 is provided a button 224 which is acted upon by an article transferred to the storage path and may be referred to as a pneumatic control member. The button 224 forms a part of a button-operated pilot control valve 670*a* connected in a pilot air control system 670*b*, as shown in FIG. 20, for controlling flow of compressed air from a pilot air source to the master control valve 662. When the button-operated pilot control valve 670*a* is acted upon by the article, the pilot air control system 670*b* becomes operable to cause the master air control valve to function to effect downward movement of the piston and cylinder 222 and lower the switching unit 221 to its lower position shown in FIG. 20.

When the article on the receiving conveyor 202 is to be delivered to the third storage path 205, for example, it advances to the stop 225 which is in its raised or upper position, as shown in FIG. 15. The receiving conveyor 202 and endless belt 649 of the driven control unit 628 are driven continuously. Hence, when the article moves against the stop 225 and is prevented from traveling on the conveyor, it will slide on the endless chains 664 of the receiving conveyor 202.

Figure 17:
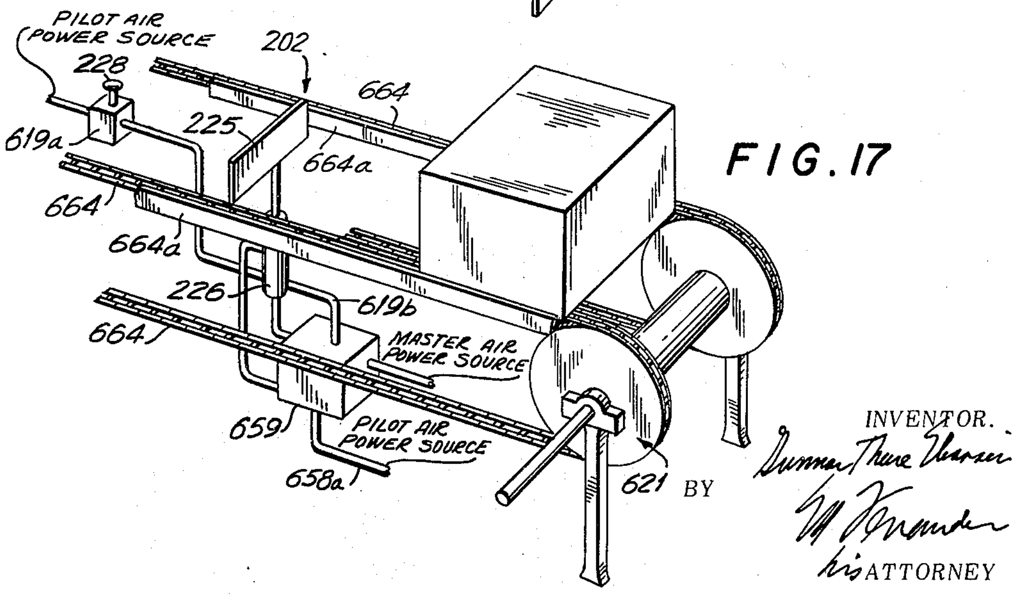

When the operating button 627 for the third storage path 205 is manually depressed or actuated automatically in an electrical system employing punched cards, an electrical circuit will be completed for the solenoid-operated pilot control valve 658 when a pin 650 in the third row of pins on endless belt 649 closes the electrical switch 651. When this occurs the pilot air control system 658*a* becomes operable to cause the master aircontrol valve 659 to function to effect downward movement of the piston in cylinder 226 and lower the stop 225 out of the path of movement of the article. Immediately after the article travels past the stop 225, it acts upon a button 228 which may be referred to as a pneumatic control member. The button 228 forms a part of a button-operated pilot control valve 619*a* connected in a pilot air control system 619*b*, as shown in FIG. 17, for controlling flow of compressed air from a pilot air control source to a master control valve 659. When the button-operated pilot control valve 619*a* is acted upon by the article, the pilot air control system 619*b* becomes operable to cause the master control valve 659 to function to effect upward movement of the piston in cylinder 226 and raise the stop 225 to its raised stop position in FIG. 17.

After the article passes the stop 225 it moves a definite distance on the conveyor 202 toward the switching unit 221 for the third storage path 205. This movement of the article on the receiving conveyor 202 is synchronized with the movement of the pin 650 which closes the switch 651, as explained above, and is traveling a definite distance toward the switch 655 for the third storage path 205. When the article reaches the switching unit 221 for the third storage path 205 and acts upon the button pneumatic control member 223, the pin 650 which previously closed switch 651 reaches the switch 655 for the third storage path, whereupon the solenoid-operated pilot valve 661 will be energized at the same time that the button-operated pilot valve 655*a* is actuated by the article. Under these conditions, the pilot air control system 661*a* becomes operable to cause the master air control valve 662 to function to effect upward movement of the piston in cylinder 222 and raise the switching unit 221 for the third storage path 205 about its pivotal connection at 669.

With the switching unit 221 in its raised position, the article will move downward by gravity over the rollers 668 onto the rollers of the third storage path 205. As explained above, the button or pneumatic control member 224, when acted upon by the article at the receiving end of the third storage path, will cause the master air control valve 662 to function to effect downward movement of the piston in cylinder 222 to lower the switching unit 221 for the third storage path 205 to its lower position shown in FIG. 20. An operating member 627 now can be actuated to release another article from the stop 225 and deliver the article to the third storage path 205 or to one of the other storage paths 203 or 204.

FIG. 6 is a diagrammatic representation of a control and electrical circuit therefor for controlling the movement of articles on the receiving line 10 in FIG. 1 and selectively transferring the articles from the receiving line to the storage lines 11, 12 and 13 with the aid of switch units 16. FIG. 6 diagrammatically illustrates the manner in which the switch units 16 in FIG. 1 are opened and closed by pneumatic cylinders 27.

Instead of employing mechanism like that just described and disclosed in Patent No. 3,173,557 for selectively operating the switch units 221, the switch units 221 can be selectively operated by the pneumatic cylinders 27 shown in FIG. 6. Further, instead of employing a dispatching unit 628 like that just described and disclosed in Patent No. 3,173,557 for selectively switching articles from the receiving line 202 to the storage paths 203, 204 and 205, a dispatching unit employing punched cards and like the unit 17 in FIG. 6 can be employed for switching articles from the receiving line 202 to the storage paths 203, 204 and 205.

When FIGS. 6 and 15 are compared it will be evident that the endless belt 18 forming a component of the speed reduction mechanism for the dispatching unit 17 in FIG. 6 can be substituted for the speed reduction mechanism 630 in FIG. 15 in which case the roller 19 in FIG. 6 would be fixed to the shaft 643 in FIG. 15.

In the description of FIG. 6, supra, it is explained that under certain conditions, movement of a movable member 21, which propels and moves an article, and the movement of the punched card, are synchronized. Under the same conditions the movement of an article on the receiving line 221 and the movement of the punched card in the dispatching unit 17 of FIG. 6 are synchronized when the dispatching unit 17 in FIG. 6 is employed in place of the dispatching unit 628 in FIG. 15. This relationship of the movement of an article on a receiving line like the line 221 in FIG. 15, for example, and the movement of a punched card in a dispatching unit like the unit 17, for example, is claimed in Patent No. 3,361,-079, of which this application is a division.

In the dispatching unit 628 shown in FIG. 15 and like that disclosed in Patent No. 3,173,557, an article is held against the stop 225 when the operating button 627 for the third storage path 205 is actuated. In this way the movement of the pin 650 which closed the switch 651 and the movement of an article in the receiving line 202 from the stop 225 are synchronized.

When a dispatching unit like the unit 17 in FIG. 6 is employed in place of the dispatching unit 628 in FIG. 15, the electrical circuit of the unit automatically functions to move a punched card from a stop position at the same time that an article starts moving from stop 82. In FIG. 6 this is accomplished when the contact breaker 81 is closed by an article carrier unit 32 to complete an electrical circuit for the solenoid-operated valve 85 and also for the solenoid 67 operatively associated with the pressure roller 56, as explained above. When this occurs the stop 82 is rendered inoperable and the article carrier unit and punched card start moving at the same time and their movement is synchronized.

In a similar manner the dispatching unit 17 in FIG. 6 can be employed in place of the dispatching unit 628 in FIG. 15. In such case the speed reduction mechanism 18 of the unit 17 is employed in place of the speed reduction mechanism 630 in FIG. 15. Further, in place of the contact breaker 81 in FIG. 6 a contact breaker 227, as shown in FIG. 9, is employed in the electrical circuit in which solenoid-operated valve 85 and solenoid 67 are connected.

In view of the foregoing, it will now be understood that the pneumatic cylinders 222 can be arranged to open and close the switch units 221 in the same manner that the switch units 16 in FIGS. 1 and 6 are opened and closed by the pneumatic cylinders 27. Further, the dispatching unit 17 in FIG. 6 can be employed in FIG. 15 in place of the dispatching unit 628 whereby material provided with dispatching information (such as punched cards) fed to the dispatching unit will move in synchronism with articles moving on the receiving line to selectively transfer and switch articles to particular storage paths. extends from the elevator 201. From the respective distribution paths, there extend storage paths, only one of which, designated 203, is shown at each level. To each storage path 203 the articles are transferred from the distribution path 202 by switch units 221 which in solid lines are shown in closed position and in dotted lines are shown in open position for transferring articles onto the storage paths.

As explained above, the platform 219 is lifted to the different levels I, II, III and IV by the individual pneumatic cylinders 216, 217 and 218 to which air under pressure is supplied by three remote or master air control valves, as will be described hereinafter, the air being supplied only to the cylinder 216 for lifting to level I, to both the cylinders 216 and 217 for lifting to level II, to both cylinders 216 and 218 for lifting to level III, and to all three pneumatic cylinders for lifting to level IV.

As shown in FIG. 9, the individual cylinders 216 and 218 abut one another and the piston of the cylinder 216 is connected at 216*a* to the bottom of the individual cylinder 217. When air is only supplied below the piston in cylinder 216, the piston in this cylinder raises the top cylinder 217 to lift the platform to the level I. When air is supplied below the piston in cylinder 216 and also below the piston in cylinder 217 the platform will be lifted to the level II. When air is supplied below the piston in cylinder 216 and above the piston in cylinder 218 the platform will be lifted to the level III. When air is supplied below the pistons in cylinders 216 and 217 and above the piston in cylinder 218 the platform will be lifted to the level IV.

To transfer the articles from the platform 219 to the article receiving lines or distribution paths 202, the platform 219 preferably is inclined, and in order to prevent the undesired rolling of articles from the platform 219, a stop 500 is provided at the lower end of the inclined platform 219 which includes spaced side rails 501 having rollers 502 therebetween which are in spaced relation. The stop 500 is provided at the lower end of the platform and can be actuated at each level I, II, III and IV by pneumatic cylinders 229, 230, 231 and 232, as will be described presently.

As seen in FIGS. 9A and 9B, the stop 500 functions to hold an article on the rollers 502 defining the top surface of the platform 219. The stop 500, which comprises an upright member, projects upward between adjacent rollers 502 and is disposed at the outer end of an arm 503 of an L-shaped lever 504 which is pivoted at 505 to the underside of a horizontal partition 506 of the platform 219, the other arm 507 of the L-shaped lever extending downward from the pivot 505 and in the path of movement of a horizontal member 508 which is axially movable in sleeves 509 at the bottom of the platform.

One end of the horizontal member 508 projects through an opening 510′ in a vertical wall 510 of the platform 219. The opposite end of the member 508 may be loosely connected at 508*a* to the arm 504. A spring 511 is disposed between the arm 507 and an upright member 512 of the platform 219. The spring 511 functions to bias the arm 507 toward the left which in turn urges the member 508 toward the left. The biasing action imparted to the arm 507 toward the left causes the arm 503 of the L-shaped lever 504 to move the stop 500 upward to its operative position and hold an article on the rollers 502 of the platform 219, as shown in FIG. 9A.

When the platform 219 is at one of the levels I, II, III and IV adjacent to one of the pneumatic cylinders 229, 230, 231 and 232, a plunger of a pneumatic cylinder when rendered operable will act against the outer end of the horizontal member 508 and move the latter toward the right in FIG. 9A and cause the L-shaped lever 504 to move counterclockwise (against the biasing action of the spring 511) to its dotted line position, thereby lowering the stop 500 out of the path of movement of the article and allowing the article to move from the platform 219 to one of the distribution paths 202 in FIG. 9.

Figure 10:
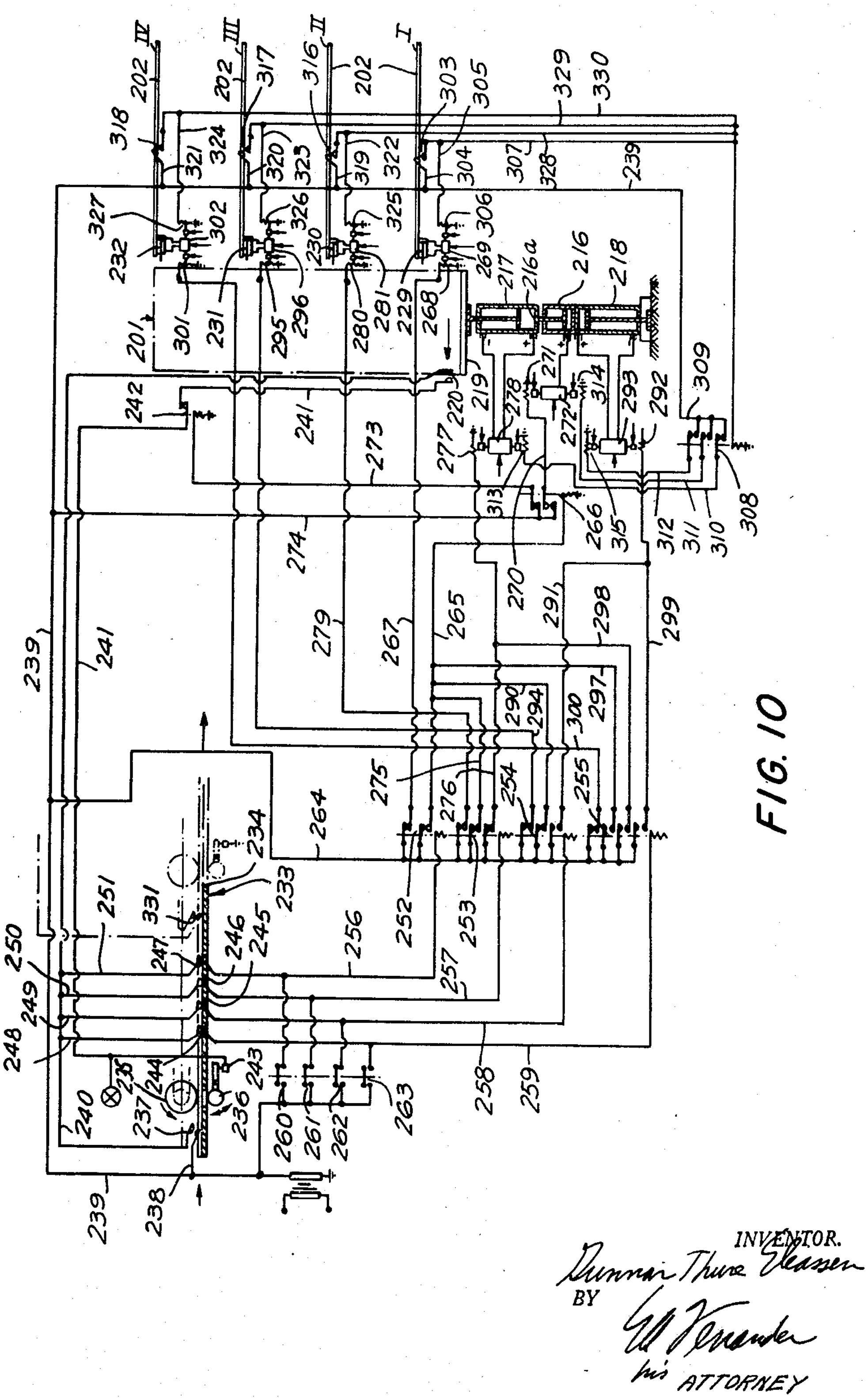
FIG. 10 is a diagrammatic representation of the electrical circuit embodied in the controls illustrated in FIG. 9.

FIG. 10 shows a schematic diagram of an arrangement employing punched cards for feeding the articles to the different levels I, II, III and IV by the elevator 201 shown in FIG. 9. The dispatching unit 233 is shown schematically in the upper left-hand part of FIG. 10 and comprises a supporting plate 234 for material including dispatching information, such as a punched card, for example, the holes of which determine the destination of the articles. The dispatching unit 233 also comprises driving rollers 235 and pressure rollers 236 to hold the punched cards against the driving rollers. In front of the first driving roller 235 a contact breaker 237 is located which can be actuated by the punched card upon its insertion into the dispatching unit. The contact breaker 237 is connected by a conductor 238 to a source of electrical supply 239 and by a conductor 240 to contact breaker 220 which is actuated by feeding an article to the platform 219.

While the contact breaker 220 is diagrammatically shown adjacent to the lower end of the platform 219 in FIG. 9, it will be understood that the contact breaker may be located at any other suitable position and function in the same manner as the contact breaker 220 in FIG. 9. For example, the contact breaker 220 is located at a side wall of the elevator or lift 201 adjacent to one of the rails 501, as diagrammatically shown in FIGS. 9A and 9B, and arranged to be actuated by an article delivered from the feed line 200 to the rollers 502 of the platform 219.

The contact breaker 220 is connected by a conductor 241 and a relay 242 therein to a solenoid 243 for the first pressure roller 236. To the right of the driving roller 235 are located a number of contact breakers 244, 245, 246 and 247 which correspond to the levels I–IV. These contact breakers are connected by the conductors 248, 249, 250 and 251 to the conductor 240 which in turn is connected to the contact breaker 237, and by conductors 256, 257, 258 and 259 to relays 252, 253, 254 and 255, respectively. To manually actuate the relays 252–255 to effect distribution of articles to the levels I–IV, four electric switches 260–263 are provided which are connected between the source of electrical supply 239 and the relays.

When material having dispatching information thereon, such as a punched card, for example, is fed into the dispatching unit 233 from the left, as indicated by the arrow in FIG. 10, it is moved past the contact breaker 237 between the driving roller 235 and the pressure roller 236. The contact breaker 238 closes a circuit for the contact breaker 220 at the elevator 201 which, when it is actuated by the articles, completes a circuit for the solenoid 243 associated with the pressure rollers 236 by the conductor 241 and the relay 242. The pressure roller 236 is lifted against the punched card which presses the latter against the driving roller 235, whereby the punched card is advanced to the right in FIG. 10. When a hole in the punched card or marking member coincides with the location of one of the contact breakers 244–247, a circuit is completed by the conductors 256, 257, 258 and 259 to the relays 252, 253, 254 and 255.

All of the relays 252–255 are connected with the source of electrical supply 239 by the conductor 264. The relay 252 is connected by conductor 265 with relay 266 and by another conductor 267 with an electric valve 268 for operating, by a remote or master air control valve 269, the pneumatic cylinder 229 (FIG. 9) at level I, the pneumatic cylinder 229 (FIG. 9) being adapted to actuate the stop 500 located on the platform 219 of the elevator 201. The relay 266 is connected by a conductor 270 to a solenoid-operated valve 271 to actuate a remote or master air control valve 272 (FIGS. 9 and 10) which is connected to the pneumatic cylinder 216 for the elevator 201. The relay 266 is also connected by a conductor 273 with the relay 242 and by a conductor 274 with the source of electrical supply 239.

The relay 253 is connected by conductors 275 and 265 with the relay 266. The relay 253 is also connected by a conductor 276 with a solenoid-operated valve 277 to operate a remote or master air control valve 278 (FIGS. 9 and 10) which is connected to the pneumatic cylinder 217 for the elevator 201. By a conductor 279 the relay 253 is also connected to a solenoid-operated valve 280 (FIGS. 9 and 10) to operate a remote or master air control valve 281 which is connected to the pneumatic cylinder 230 at level II. The relay 254 is connected by conductors 290 and 265 to the relay 266, and by a conductor 291 to a solenoid-operated valve 292 (FIGS. 9 and 10) to operate a remote or master air control valve 293 which is connected to the pneumatic cylinder 218 for the elevator 201.

The relay 254 is connected by a conductor 294 to a solenoid-operated valve 295 (FIGS. 9 and 10) to operate a remote or master air control valve 296 which is connected to the pneumatic cylinder 231 at level III. The relay 255 is connected by conductors 297 and 265 to the relay 266, and by a conductor 298 to the same solenoid-operated valve 278 to which the relay 253 is connected. The relay 255 is also connected by a conductor 299 to the same solenoid-operated valve 292 to which the relay 294 is connected by conductor 291. The relay 255 is connected by a conductor 300 to solenoid-operated valve 301 (FIGS. 9 and 10) to operate a remote or master air control valve 302 which is connected to the pneumatic cylinder 232 at level IV.

When a hole in the punched card coincides with the contact breaker 247 in the dispatching unit 233, a circuit is completed by the conductor 256 to the relay 252. From the relay 252, a circuit is completed by conductor 265 to the relay 266 and a circuit is completed by the conductor 267 to the solenoid-operated valve 268. From the relay 266 two circuits are completed, one by the conductor 270 to the solenoid-operated valve 271 which actuates the remote or master air control valve 272 to supply air under pressure to the pneumatic cylinder 216 to render it operable to lift the platform 219 to the level I, and one by the conductor 273 to the relay 242 which interrupts the current to the solenoid 243 associated with the pressure roller 236 of the dispatching unit, whereby the pressure roller no longer functions to hold the punched card against the driving roller and the card stops moving.

The solenoid-operated valve 268 actuates the remote or master air control valve 269 to supply air under pressure to the pneumatic cylinder 229 at the level I which functions to actuate the stop 500 on the platform 219. By actuating the stop 500 by the cylinder 229 to render it inoperable, the article on the inclined platform 219 is released and can roll by gravity, as shown in FIG. 9, onto the distribution path 202 at level I. A contact breaker 303 in the distribution path is connected by a conductor 304 to the source of electrical supply 239 and by a conductor 305 to a solenoid-operated valve 306 associated with the remote or master air control valve 269 connected to operate the pneumatic cylinder 229 and by a conductor 307 to a relay 308. The relay 308 is connected by a conductor 309 to the source of electrical supply 239 and by three conductors 310, 311 and 312 to the solenoid-operated valves 313, 314 and 315, respectively, associated with the remote or master air control valves 278, 272 and 293, respectively, to operate the pneumatic cylinders 217, 216 and 218, respectively.

After an article fed to the distribution path 202 at level I actuates the contact breaker 303, a circuit is completed for the solenoid-operated valve 306, whereby the remote or master air control valve 269 is rendered operable to return the pneumatic cylinder 229 to an inactive position. At the same time, a circuit is completed for the relay 308 by the conductor 307, the relay 308 in turn completing a circuit by the conductors 310–312 from the conductor 309 to the solenoid-operated valves 313–315. The solenoid-operated valves 313 and 315 actuate the remote or master air control valves 278 and 293 whereby the latter can supply air under pressure to the negative sides of the pneumatic cylinders 217 and 218, and the solenoid-operated valve 314 actuates the remote or master air control valve 272 so that the latter will function to enable air to be evacuated from the pneumatic cylinder 216.

Contact breakers 316–318, which correspond to the contact breaker 303, are provided for levels II–IV and are connected by conductors 319, 320 and 321, respectively, to the source of electrical supply 239 and by conductors 322, 323 and 324, respectively, to solenoid-operated valves 325, 326 and 327, respectively, for the remote or master air control valves 281, 296 and 302, respectively. Also, the contact breakers 316–318 are connected by conductors 328, 329 and 330, respectively, to the relay 308. Due to the fact that each contact breaker 303, 316–318 actuates the pneumatic cylinders 216–218, the elevator 201 is always returned to its starting position.

It should be understood that the dispatching unit 233 in FIG. 10 can also be adapted for continued distribution of articles from the article receiving lines or distribution paths 202 to the respective storage paths, and for this purpose a schematic development of the dispatching unit is shown in dotted lines which includes a contact breaker 331 which can be arranged to function in the same manner as the contact breaker 68 in the embodiment of FIG. 6. In FIG. 6 the contact breaker 68 is connected to the contact breaker 72 which is actuated by the propelling members 21 of the belt 15. While the control arrangement in FIG. 6 is embodied in an installation in which articles are suspended from carrier units, it should be understood that the contact breaker 331 also can be connected to the contact breaker 227 in front of the stop 225 of the distributing path, as shown in FIG. 9, in an installation in which articles are supported at their bottoms. In such case, the dispatching unit can be of the kind shown in FIG. 6 and described above.

In FIGS. 14, 16, 21 and 22 I have also illustrated that part of the disclosure of Patent No. 3,173,557 which shows the manner in which articles are transferred from the several storage paths 203 to 205 to the delivery lines or collecting paths 206 which extend toward the elevator 207. The articles can be selectively transferred by switch units 631 from the storage paths 203, 204 and 205 to the delivery lines or collecting paths 206 arranged to be operated over end rollers 633 and 634 which may be driven by a suitable electric motor (not shown) like the motor 623 for the receiving conveyor 202. Each article is automatically transferred from its storage path 203, 204 or 205 to the delivery line 206 by depressing on a control panel 635 a particular operating member 636 corresponding to the storage path selected, three such operating members being provided on the control panel 635. At the vicinity of each delivery line 206 a stop 637 is provided in each storage path 203, 204 and 205 which normally is in the path of movement of the articles and limits their movement toward a delivery line 206. When a particular operating member 636 is depressed, one of the switch units 631 is rendered operable to permit an article to be transferred from its storage path to a delivery line 206, at which time the stop 637 momentarily is rendered ineffective and out of the path of movement of the article immediately adjacent to the delivery line.

Figure 14:
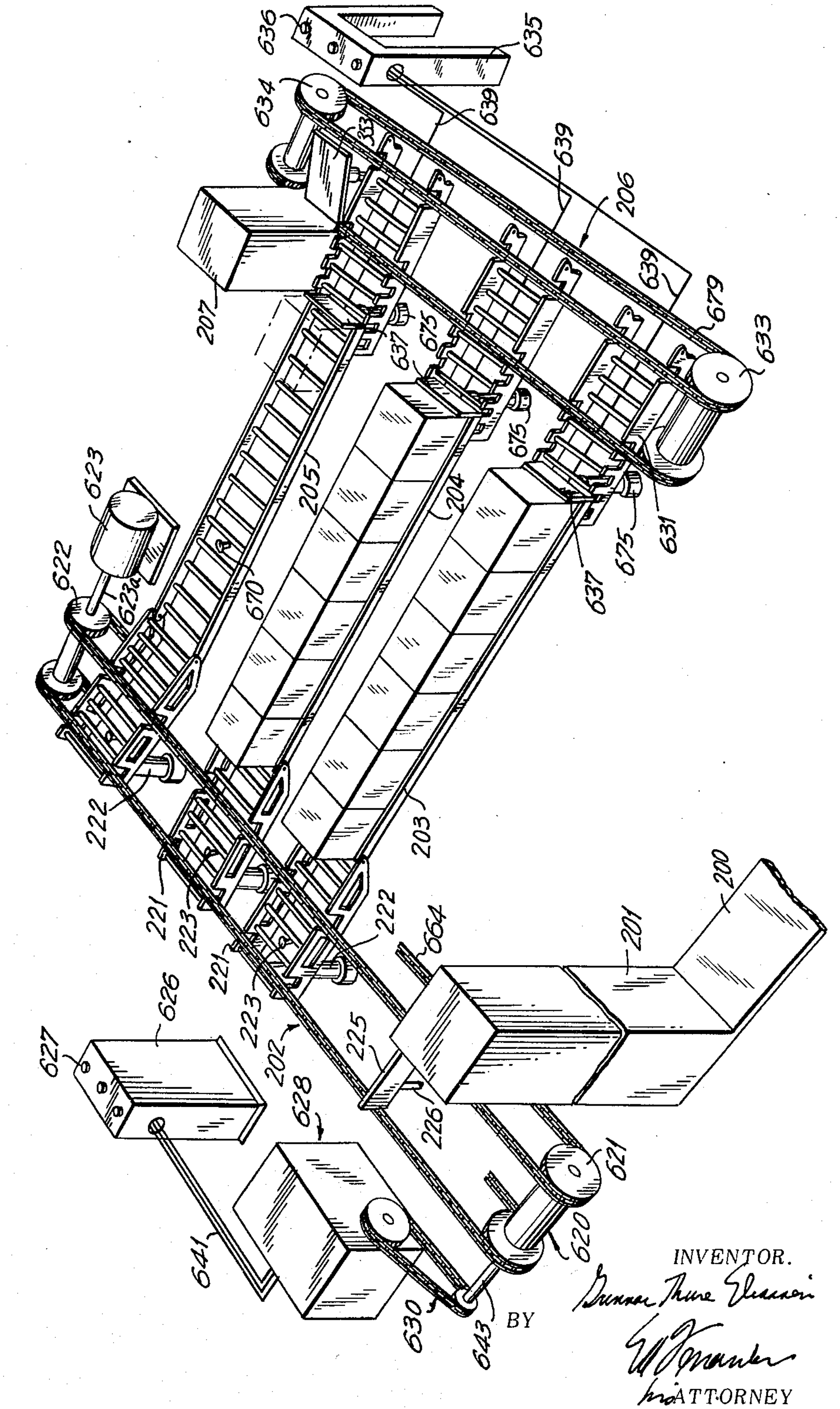
FIG. 14 is a perspective view of parts shown in FIGS. 9, 11 and 13.

In FIG. 14 I have diagrammatically shown electrical conductors 639 connecting the dispatching or switch units 631 and the operating panel 635, each conductor being associated with a different one of the operating members 636. The storage paths 203, 204 and 205 slope downward from the receiving conveyor 202 to the delivery line 206 to promote downward gravity movement of the articles toward the stops 637.

Figure 21:
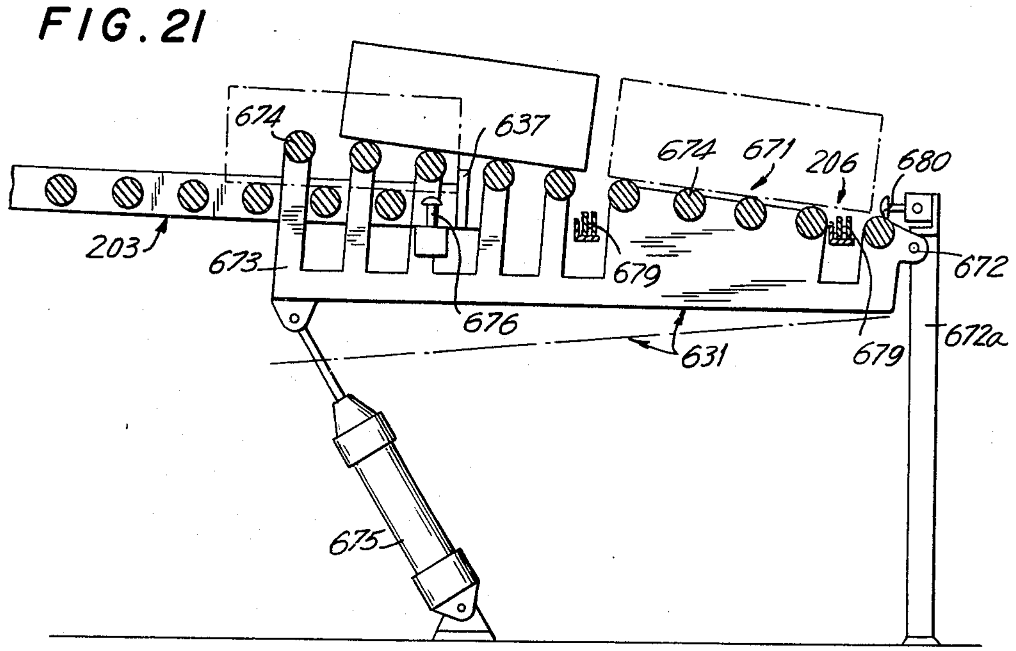
FIG. 21 is a side elevation of parts shown in FIG. 16.
Figure 22:
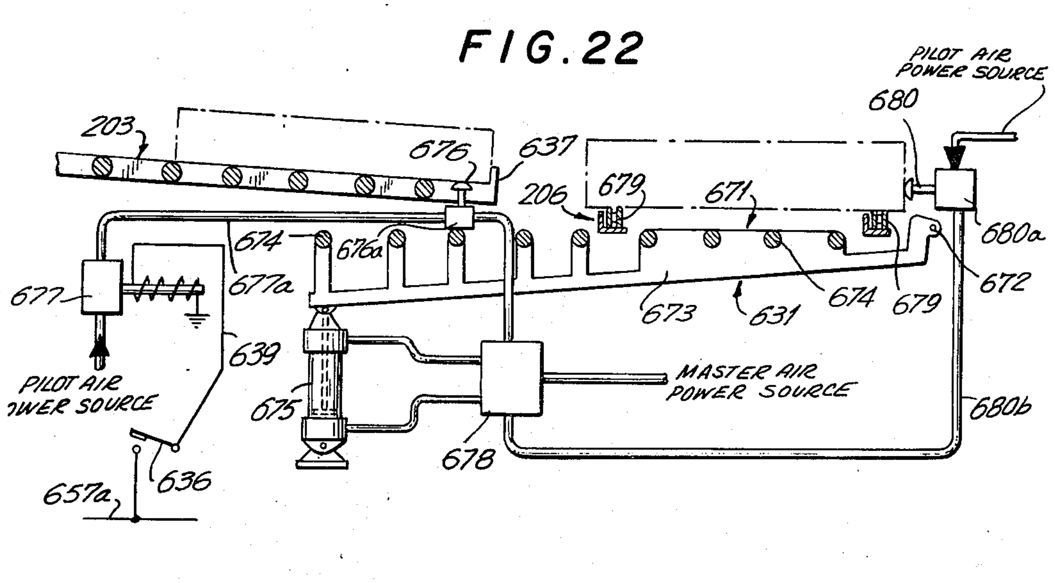
FIG. 22 diagrammatically illustrates the parts shown in FIG. 21 and additional control features.

Each article resting against a stop 637 can be transferred from a storage path 203, 204 and 205 to a delivery line 206 by one of the switch units 631. As best shown in FIGS. 16, 21 and 22, each switch unit 631 comprises a frame 671 having spaced sides 673 in which the opposite ends of rollers 674 are fixed. Each switch unit 631 is pivotally connected at 672 to upright members **672*a* at one side of a delivery line 206. At its opposite outer end each switch unit 631 is connected to the vertically movable piston of a cylinder 675 which is pneumatically operated by a fluid under pressure, such as compressed air, for example. Portions of the spaced sides 673 are recessed or notched to permit the rollers 674 of the frame 671 to be raised above the chain conveyors 679, which are like the chain conveyors 664 in the receiving conveyor 202**, to the position shown in FIG. 21.

When an article has moved against a stop 637, the article acts upon a button 676 which may be referred to as a pneumatic control member. The button 676 forms a part of a button operated pilot valve **676*a* connected in a pilot air control system 677*a*, as shown in FIG. 22. A solenoid operated pilot valve 677, which is also provided in the pilot air control system 677*a*, is actuated by closing one of the operating members 636 on the control panel 635. As seen in FIG. 22, the completes an electrical circuit from a source of electrical energy through conductor 657*a*, switch or operating member 636, conductor 639 and solenoid-operated pilot valve 677** to ground.

The pilot air control system **677*a* controls flow of compressed air from a pilot air source through pilot valve 677 and 676*a* to a master control valve 678 which is arranged to supply compressed air from a master air power source either to the space above or below the piston and cylinder 675. When the solenoid-operated pilot valve 677 is energized and button operated pilot valve 676*a* is actuated the pilot air control system 677*a* causes master air control valve 678 to function and effect upward movement of the piston in cylinder 675 to raise the switch unit 631 about its pivotal connection 672 from the dotted line to the solenoid line position in FIG. 21. The outer end of the switch unit 631 extends beyond the stop 637 for a sufficient distance so that, when the switch unit 631 raises and lifts the article from the storage path 203, 204 or 205**, the outer end of the unit extends beyond the center of gravity of the article.

When the rollers 674 of the switch unit 631 are at a level above the top edge of a stop 637, the article rolls by gravity over the conveyor chains 679 of the delivery conveyor 632, as indicated in dotted lines in FIGS. 21 and 22. When this occurs the article acts upon a button or pneumatic control member 680. The button 680 forms a part of a button operated pilot control valve **680*a* connected in a pilot air control system 680*b*, as shown in FIG. 22, for controlling flow of compressed air from a pilot air source to the master control valve 678. When the button operated control valve 680*a* is acted upon by an article, the pilot air control system 680*b* becomes operable to cause the master air control valve 678 to function to effect downward movement of the piston in cylinder 675 and lower the switch unit 631 to the position shown in FIG. 22. When this occurs the next article in a storage path 203, 204 or 205 can move against a stop 637**.

FIG. 7 is a diagrammatic representation of a control and electrical circuit therefor for selectively controlling the transfer of articles from the storage paths 12 and 13 to the article delivery line or collecting path 14. FIG. 7 diagrammatically illustrates the manner in which the switch units 22 in FIG. 1 are opened and closed by pneumatic cylinders 27.

Instead of employing mechanism like that just described and disclosed in Patent No. 3,173,557 for selectively operating the switch units 631 in FIGS. 14, 21 and 22, the switch units 631 can be selectively operated by the pneumatic cylinders 27 shown in FIG. 7. Further, instead of employing a dispatching unit 635 like that described and just disclosed in Patent No. 3,173,557 for selectively transferring articles from the storage paths 203, 204 and 205 to the article delivery line or collecting path 206, a dispatching unit employing punched cards and like the unit 120 in FIG. 7 can be employed for transferring articles from the storage paths 203, 204 and 205 to the article delivery line 206.

FIG. 11 schematically illustrates the delivery side of the conveyor system shown in FIG. 8. At each level I–IV, an article delivery line or collecting path 206, to which articles are transferred from the storage paths in the manner just explained, extends toward the elevator 207. Each collecting path 206 is provided with a switch unit 350, 351, 352 and 353, respectively, each switch unit being shown in its closed position in solid lines and in its open position in dotted lines. The switch units 350–353 are moved to these positions by pneumatic cylinders 358, 359, 360 and 361, respectively, operated by remote or master air control valves 354, 355, 356 and 357, respectively. At each switch unit is located a pilot air control valve 362, 363, 364 and 365, respectively, actuated by the articles, as will be described hereinafter.

The switch units 350–353 in FIG. 11 are provided between the storage paths 205 and the end rollers 634 of each collecting path 206. In FIG. 14 I have diagrammatically illustrated such a switch unit for the switch unit 353 in the article collecting line 206 at the top level IV shown in FIG. 11.

The elevator or lift 207 comprises a platform 369 which is displaceable to the different levels I–IV in an elevator shaft 366 by pneumatic cylinders 367 and 368. To these cylinders are supplied air under pressure by two remote or master air control valves 370 and 371. To lift the platform 369 from the level I to level II air under pressure is supplied only to the cylinder 367, to lift the platform to level III air under pressure is supplied to the cylinder 368, and to lift the platform to level IV air under pressure is supplied both to cylinders 367 and 368. At the different levels valves and contact breakers 372–382 are provided which are actuated by the articles and the platform, respectively. The platform 369 is like the platform 219 for the elevator 201 and is inclined downward to the delivery side so that articles on the platform can move by gravity onto the delivery path 208 in front of the elevator which is provided with a switch unit 383 by the articles can be lowered to a level with the delivery which the articles can be lowered to a level with the delivery path 208.

The switch unit 383 can be moved downward from an upper position indicated in dotted lines to a lower position indicated in solid lines by a pneumatic cylinder 384 which is operated by a remote or master air control valve 385. Pilot air control valves actuated by the switch unit and the articles, respectively, are indicated at 386 and 387, respectively. In the delivery path 208 are provided two pilot air control valves 388 and 389 which are actuated by articles delivered to the path 208.

Figure 12:
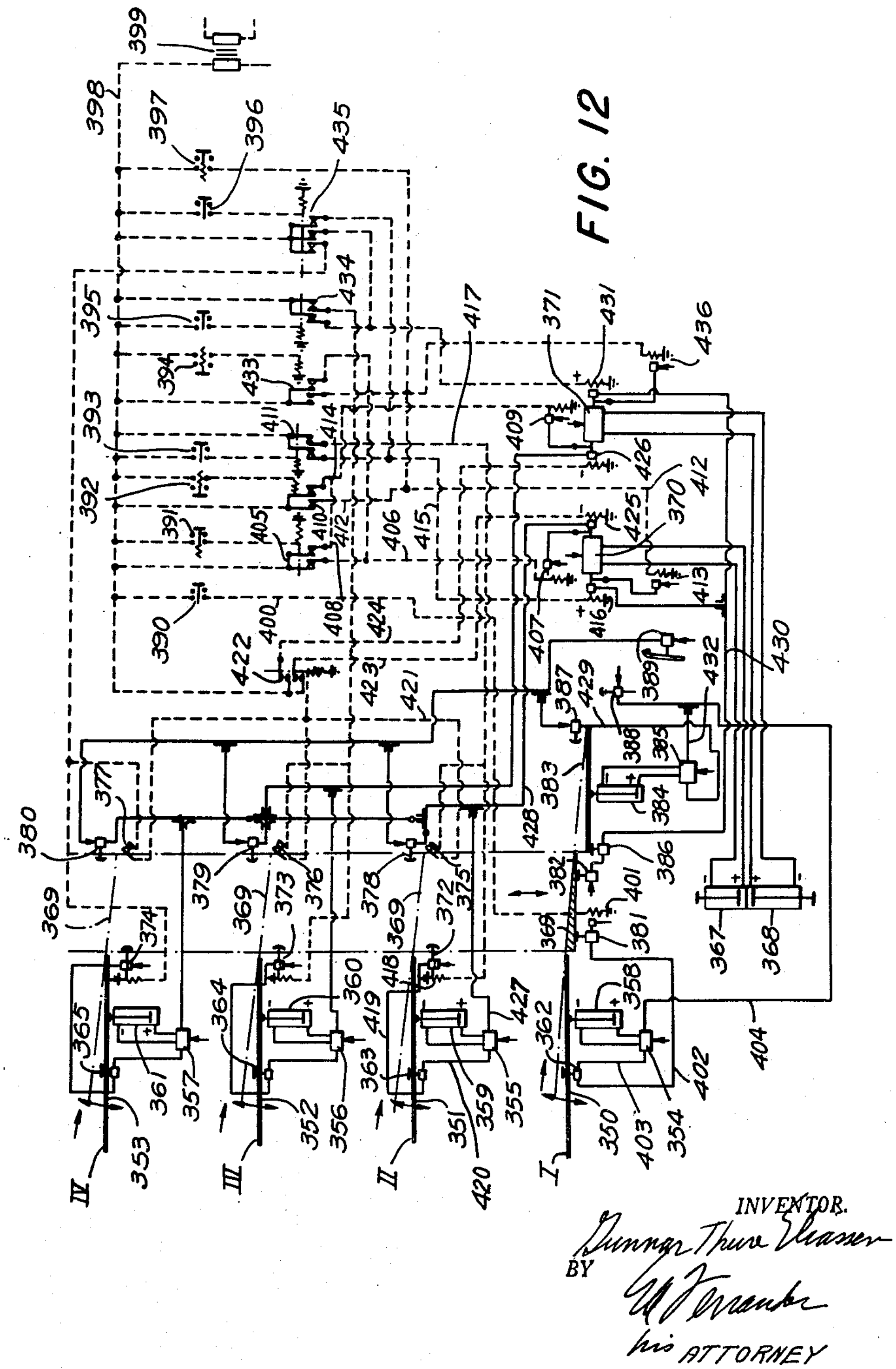
FIG. 12 is a diagrammatic representation of an electrical circuit embodied in the controls illustrated in FIG. 11.

FIG. 12 shows a schematic diagram for the delivery side of the conveyor system shown in FIG. 11. The switch units 350–353 located at the different levels I–IV are illustrated in dotted lines in their upper positions to feed articles onto the platform 369, and by solid lines in their lower positions to receive articles from the collecting paths 206. The platform 369 is shown in solid lines at level I, and the position for the platform at the other levels II–IV is indicated by dotted lines. In the connecting diagram, electrical conductors are represented by dotted lines, and conduits for conducting air under pressure are represented by solid lines, a non-return valve in an air conduit being represented by a circle in a solid line. Although the cylinders 367 and 368 are intended to lift the platform 369 to the different levels I to IV, in order to simplify the drawings they are not shown connected to the platform.

To remove articles from each level I–IV, pairs of contact breakers 390 and 391, 392 and 393, 394 and 395, and 396 and 397, respectively, are employed, as shown in FIG. 12. These contact breakers desirably are manually operable, although it should be understood that they can be actuated by a dispatching unit like that shown and described above. All of the contact breakers 390–397 are connected by a conductor 398 with a source of electrical supply 399. In the pairs of contact breakers provided, only one, such as the contact breaker 392, for example, is adapted to be closed for a given interval of time to effect removal of a single article from one level. The other, such as the contact breaker 393, for example, is adapted to be closed for a longer interval of time depending upon the number of articles removed in succession from the same level. These pairs of contact breakers can be combined into a unit which, when it is actuated, first functions to close the contact breaker for the given interval of time that will effect removal of a single article from one level and also functions to close the contact breaker for the longer interval of time depending upon the number of articles removed in succession from the same level. This is of importance in the removal of more than one article from the same level, as will be brought out hereinafter. When the delivery of articles is controlled by a dispatching unit operated by punched cards, for example, and a card accompanies each article or package, the contact breakers can only be closed for the given interval of time to effect removal of the article from one level.

The contact breaker 390 is connected by a conductor 400 with a solenoid-operated valve 401 which is adapted to supply air under pressure to control valve 381 actuated by the platform 369. When the platform 369 is at level I, the valve 381 is actuated and a connection is effected by air conduit 402 to the control valve 362 at the switch unit 350 when it is actuated by an article thereon. When the control valve 362 is actuated by an article, a connection is produced by a conduit 403 to the remote or master air control valve 354 to supply air under pressure to the pneumatic cylinder 358. The cylinder 358 becomes effective to lift the switch unit 350, whereby an article thereon moves by gravity onto the platform 369 and subsequently from the platform onto the switch unit 383 of the delivery path 208, as will be described hereinafter.

The second contact breaker 391 to feed articles from level I is connected to a relay 405. The relay 405 is connected by conductor 398 to the source of electrical supply 399 and by a conductor 406 to a solenoid-operated valve 407 associated with remote valve 370 to supply compressed air to the pneumatic cylinder 367 of the platform 369, and by the conductor 408 to a solenoid-operated valve 409 associated with remote valve 371 to supply compressed air to the pneumatic cylinder 368 of the platform 369. Both solenoid-operated valves 407 and 409 are adapted to actuate the remote valves 370 and 371 in such a manner that compressed air is supplied to the pneumatic cylinders 367 and 368 to cause the platform 369 to move downward from any of levels II to IV to level I. The contact breakers 392 and 393 for delivering the articles from level I are respectively connected to relays 410, 411 which are connected by conductors 398 to the source of electrical supply 399. The relay 410 is connected by a conductor 412 to a solenoid-operated valve 413 and by conductor 414 to solenoid-operated valve 409. The solenoid-operated valve 413 is adapted to actuate the remote valve 370 and the solenoid-operated valve 409, as explained above, is adapted to actuate the remote valve 371. The relay 411 is connected by a conductor 415 to a solenoid-operated valve 416 to actuate the remote valve 370. The relay 411 is connected by a conductor to 417 to a solenoid-operated valve 418 to supply compressed air to the control valve 372, and to the contact breaker 375 which, like the valve 372, can be actuated by the platform 369. The valve 372 is connected by a conduit 419 to the control valve 363 which is actuated by the article on the switch unit 351. The control valve 363 is connected by a conduit 420 to a remote valve 355 which supplies compressed air to the pneumatic cylinder 359 for the switch unit 351. The contact breaker 375 is connected by a conductor 421 to a relay 422 which in turn is connected by conductors 423 and 424 to solenoid-operated valves 425 and 426, respectively, to effect operation of the remote valves 370 and 371.

When articles are fed from the level II, the contact breakers 392 and 393 are actuated. When the contact breaker 392 is actuated, a circuit is completed from the relay 410 by conductor 412 to the solenoid-operated valve 413 and by conductor 414 to solenoid-operated valve 409. When the platform 369 is at level IV and the pneumatic cylinder 368 is actuated by the remote control 371 and the solenoid-operated valve 409 associated therewith, compressed air is fed to the negative side of the cylinder 368 to cause the latter to move downward and lower the platform 369 to level II. When the platform 369 is at level III and the pneumatic cylinder 368 is actuated by the remote valve 371 and the solenoid-operated valve 409 associated therewith to lower the platform to its bottom position, and at the same time the pneumatic cylinder 367 is actuated by the remote valve 370 and the solenoid-operated valve 413 associated therewith to move the platform upward, the platform 369 will be moved to level II. If the platform 369 should be at level II, the operation just described would not occur and the controls would be ineffective to actuate cylinders 367 and 368. When the platform 369 is at level I and the pneumatic cylinder 367 is actuated by the remote valve 370 and the solenoid-operated valve 413 associated therewith to move the platform upward, the platform will be raised to the level II.

When contact breaker 393 is actuated, a circuit is completed from the relay 411 by the conductor 415 to the solenoid-operated valve 416, and a circuit also is completed therefrom by the conductor 417 to the solenoid-operated valve 418 and the control switch 375 at level II. When the platform 369 is located at level II, it actuates the control valve 372 and the contact breaker 375. When the solenoid-operated valve 418 functions to supply compressed air to the control valve 372 and the platform 369 causes this valve to open, compressed air is supplied by the conduit 419 to the control valve 363. When the control valve 363 is opened by an article on the switch unit 351 and compressed air is supplied by the conduit 420 to the remote valve 355, the latter functions to cause the pneumatic cylinder 359 to lift the switch unit 351.

Articles move by gravity from the switch unit 351 onto the platform 369. When this occurs the control valve 378 is actuated. The control valve 378 is connected by a conduit 427 to the remote valve 355 and by a conduit 428 to the solenoid-operated valve 425. When the control valve 378 is actuated, compressed air is supplied to the remote valve 355 and functions to cause the pneumatic cylinder 359 to lower the switch unit 351. When the contact breaker 375 is actuated by the platform 369, it completes a circuit to the relay 422 by the conductor 421, and the relay 422 in turn completes circuits by the conductors 423 and 424 to the solenoid-operated valves 425 and 426, respectively. When compressed air is supplied to solenoid-operated valve 425, only the remote valve 370 is actuated which functions to supply compressed air to the negative side of the pneumatic cylinder 367 to move it to its bottom position and lower the platform 369 to level I.

At level I the platform 369 actuates control valve 382 which is in communication with the control valve 386 which in turn is actuated by the switch unit 383 associated with the delivery path 208. The articles move by gravity from the platform 369 onto the switch unit 383 which is always in its upper position after articles have moved therefrom. The article on the switch unit 383 actuates the control valve 387 which is connected by a conduit 429 to the remote valve 385 operatively associated with the pneumatic cylinder 384 for operating the switch unit 383. When an article or package actuates the control valve 387, compressed air is supplied to the remote valve 385 which functions to supply compressed air to the pneumatic cylinder 384 to render it operable to lower the switch unit 383. The article is moved downward by the switch unit 383 onto the delivery path 208 on which the article moves from the switch unit 383. In its lower position the switch unit 383 actuates the control valve 386 which is connected by the conduit 430 to the solenoid-operated valve 416 associated with the remote valve 370 and also to another solenoid-operated valve 431 associated with the remote valve 371. Compressed air is supplied to the remote valve 371 when control valve 386 is actuated. But since no circuit is completed for solenoid-operated valve 431 at the time this occurs, the remote valve 371 remains inactive. However, when control valve 386 is actuated a circuit is completed for solenoid-operated valve 416, whereby remote valve 370 is rendered operable to cause the pneumatic cylinder 367 to lift the platform 369 to level II.

In the delivery path 208 a control valve 388 is provided which is actuated by the articles. The control valve 388 is connected by a conduit 432 to the remote valve 385 associated with the pneumatic cylinder 384 for operating the switch unit 383 and by a conduit 404 to the remote valve 354 associated with the pneumatic cylinder 358 for operating the switch unit 350. When the control valve 388 is acted upon by an article, compressed air is supplied from the valve 388 to the remote valve 385 which functions to supply compressed air to the pneumatic cylinder 384 which is rendered operable to raise the switch unit 383 to its upper position. Compressed air also is supplied from the control valve 388 to the remote valve 354 which functions to supply compressed air to the pneumatic cylinder 358 which is rendered operable to lower the switch unit 350. Hence, the control valve 388 in the delivery path 308 functions to return the switch unit 383 in the delivery path to its upper position and to return the switch unit 350 at level I to its lower position.

In addition, a control valve 389 is provided in the delivery path 208. As shown in FIG. 12, the control valve 389 is connected to all of the valves 387, 378, 379 and 380 at the different levels I–IV and functions as a safety or relief valve. If the delivery path 208 is full of articles whereby the valve 389 is actuated continuously, compressed air will not be supplied to the valves 387 and 378 to 380.

It will be understood that the other manually actuated contact breakers 394 to 397 for delivery of articles from levels III and IV are substantially connected in the same manner as the contact breakers described above. In order to effect delivery of articles from levels III and IV three relays 433–435 are provided together with another solenoid-operated valve 436 associated with the remote valve 371. In view of the above description, it is not necessary to describe these additional relays and solenoid-operated valve directed to the delivery of articles from levels III and IV.

I claim:

1. A conveying system comprising:

(a) a plurality of conveying units for supporting articls and along which the articles are movable, said conveying units being disposed at a number of different levels one above another, (b) each conveying unit including an article receiving line, means for moving articles along said receiving line, a plurality of storage paths, first means for transferring articles from said receiving line to said storage paths, an article collecting line, means for moving articles along said collecting line, and second means for transferring articles from said storage paths to said collecting line, (c) a feed line for supporting articles and along which the articles are movable, (d) first elevator means having a first vertically movable platform and means for moving said first platform, (e) third means including said first elevator means for transferring articles from said feed line to the article receiving lines of said conveying units at the different levels, (f) a delivery line for supporting articles and along which the articles are movable, (g) second elevator means having a second vertically movable platform and means for moving said second platform, (h) fourth means including said second elevator means for transferring articles from the article collecting lines of said conveying units at the different levels to said delivery line, (i) a first movable member and first mechanism therefor for moving said first member to regulate the movement of articles on said feed line past said first member to said first elevator means, and means for operating said first mechanism, (j) said fourth article transferring means including a second movable member and second mechanism therefor for each of said conveying units, said second mechanisms being operable to move said second members to regulate the movement of articles on said collecting lines to said second elevator means, and means for operating said second mechanisms, (k) a first control for the conveying system operable by means including material having displatching information, such as a punched card, for example, said first control providing a path of movement for the material, means for moving the material along the path of movement, a plurality of first control elements along the path of movement, and first operating means responsive to the material fed to said first control and said first control elements to render said third article transferring means operable to selectively transfer articles from said feed line to the article receiving lines of said conveying units at the different levels, (l) each of said conveying units having a second control operable by means including material having dispatching information, such as a punched card, for example, each of said second controls providing a path of movement for the material and having means for moving the material along the path of movement and a plurality of second control elements along the path of movement, and second operating means responsive to the material fed to each of said second controls and said second control elements associated therewith to render said first article transferring means of each conveying unit operable to selectively transfer articles from its article receiving line to said storage paths associated therewith, and (m) each of said conveying units having a third control operable by means including material having dispatching information, such as a punched card, for example, each of said third controls providing a path of movement for the material and having means for moving the material along the path of movement and a plurality of third control elements along the path of movement, and third operating means responsive to the material fed to each of said third controls and said third control elements associated therewith to render said second article transferring means of each conveying unit operable to selectively transfer articles from its storage paths to said article collecting line associated therewith.

2. A conveying system as set forth in claim 1 in which:

(a) said third article transferring means includes holding means to hold on the surface of said first platform of said first elevator means at least one article supported thereon when said first platform is being moved vertically by its moving means, (b) means at said appropriate different levels for rendering said hold means ineffective to enable the articles to move from the surface of said first platform when the latter is at said appropriate different levels, and (c) means at said appropriate different levels responsive to movement of the articles from said first platform to said article receiving lines at said appropriate different levels to render said holding means effective again to hold at least one article on the surface of said first platform and to render said first platform moving means operable to move said first platform downward.

3. A conveying system as set forth in claim 2 in which said first operating means of said first control further includes structure for rendering said first platform moving means operable to move said first platform upward to said particular different levels responsive to movement of an article from said feed line on the surface of said first platform.

4. A conveying system as set forth in claim 1 in which:

(a) said third article transferring means includes holding means to hold on the surface of said first platform of said first elevator means at least one article adapted to move thereon from said feed line.

(b) said first operating means of said first control further including:

(1) means for rendering said first platform moving means operable to move said first platform upward when an article has moved thereon from said feed line and (2) means for rendering said holding means ineffective to enable the articles to move from the surface of said first platform when the latter reaches said appropriate different levels, and (3) means operable when articles move from said first platform to said article receiving lines at said appropriate different levels to render said holding means effective again to hold at least one article on the surface of said first platform and to render said first platform moving means operable to move said first platform downward to receive another article adapted to move thereon from said feed line.

5. A conveying system as set forth in claim 3 which includes:

(a) a first contact breaker which is closed responsive to movement of an article from said feed line on the surface of said first platform, (b) said means for moving the dispatching information material of said first control along its path of movement being rendered operable by means including said first contact breaker when the latter is closed, and (c) means including said structure and a plurality of said first control elements of said first control for selectively controlling said first operating means to render said first platform moving means operable to move said first platform to said particular different levels.

6. A conveying system as set forth in claim 5 in which:

(a) said means for rendering said material moving means of said first control operable to move said material along its path of movement includes a relay, and (a) said first control comprising an electrical circuit for opening said relay and stopping movement of said material along its path of movement responsive to selective functioning of one of said first control elements substantially at the same time that said first platform moving means is rendered operable to move said first platform to said particular different levels.

7. A conveying system as set forth in claim 1 in which said fourth article transferring means includes:

(a) first control means for controlling said operating means for said second mechanism of each of said conveying units, (b) said second mechanism in each of said conveying units being operable to move said second member associated therewith to first and second positions and in its second position forming a part of said collecting line in each conveying unit, (c) a plurality of second control means for controlling said means for moving said second platform of said second elevator means, (d) each of said second control means functioning to render said second platform moving means operable to transfer to said delivery line articles moving on said second platform at the different levels at which said conveying units are disposed, (e) a plurality of third control means for actuating said second platform moving means, each of said third control means functioning to actuate said second platform moving means to position said second platform moving means to position said second plat-platform at a different level, (f) said first control means for each of said collecting lines being operable to move said second member associated therewith from its second position to its first position in the path of movement of articles moving in each collecting line to regulate the movement of articles to said second elevator means, (g) means responsive to movement of said second platform to a particular level to render said first control means at such level operable to control said operating means for said second mechanism to move said second movable member to its first position to promote movement of at least one article from said collecting line at such level to said second platform.

(h) means functioning to act on said second elevator moving means for said second platform, responsive to movement of at least one article thereon, to position said second platform at the appropriate level to effect transfer of the article from said second platform to said delivery line, and (i) means at the last-mentioned appropriate level to effect transfer of the article from said second platform to said delivery line.

8. A conveying system as set forth in claim 1 in which said fourth article transferring means includes:

(a) first control means for controlling said operating means for said second mechanisms of said conveying units, (b) a plurality of third control means for controlling said means for moving said second platform of said second elevator means, each of said second control means functioning to render said second platform moving means operable to position said second platform at a different particular level at which one of said conveying units is disposed, (c) second control means for controlling said second mechanism operating means to selectively regulate and enable at least one article on one of said collecting lines at a particular level to move to said second elevator means, (d) means respnsive to movement of said second platform to said particular level to render said third control means at said particular level operable to control said second mechanism operating means associated therewith to selectively regulate and enable at least one article on said collecting line at said particular level to move to said second platform, (e) means functioning to render said second platform moving means operable, responsive to at least one article on said second platform, to move said second platform to the appropriate level for transferring the article to said delivery line, and (f) means at the last-mentioned appropriate level to effect transfer of the article from said second platform to said delivery line.

9. A conveying system as set forth in claim 1 in which:

(a) said second movable member in each of said conveying units is movable to first and second positions and in its second position forms a part of said collecting line in each conveying unit, (b) each of said second movable members in its second position being operable to support an article thereon in said collecting line with which it is associated, (c) said second mechanisms being operable to raise said second movable members from their second positions to their first positions in the paths of movement of articles moving on said collecting lines to regulate the movement of articles to said second elevator means, (d) said means for operating said second mechanisms comprising pneumatic means, and (e) control means for controlling the pneumatic means of each of said second mechanisms at a different one of the levels at which a conveying unit is disposed to raise said second movable member associated therewith at a particular level to its first position responsive to the position of said second platform of said second elevator means at such particular level.

10. A conveying system as set forth in claim 9 in which:

(a) each of said second movable members in its first position is inclined to the horizontal to promote movement of articles therefrom by gravity onto said second platform of said second elevator means, (b) said means for moving said second platform being operable to move said second platform vertically downward to a lower zone at the vicinity of said delivery line responsive to the presence of an article on said second platform, and (c) said means for operating said mechanisms being operable to move any one of said second members at a particular level to its second position responsive to the presence of an article on said second platform at such particular level.

11. A conveying system comprising:

(a) a plurality of conveying units for supporting articles and along which the articles are movable, said conveying units being disposed at a number of different levels one above another, (b) each conveying unit including an article receiving line, means for moving articles along said receiving line, a plurality of storage paths, first means for transferring articles from said receiving line to said storage paths, an article collecting line, means for moving articles along said collecting line, and second means for transferring articles from said storage paths to said collecting line, (c) a feed line for supporting articles and along which the articles are movable, (d) first elevator means having a first vertically movable platform and means for moving said first platform, the articles on said feed line being movable to said first elevator means, (e) third means including said first elevator means for transferring articles from said feed line to the article receiving lines of said conveying units at the different levels, (f) a delivery line for supporting articles and along which the articles are movable, (g) second elevator means having a second vertically movable platform and means for moving said second platform, (h) fourth means including said second elevator means for transferring articles from the article collecting lines of said conveying units at the different levels to said delivery line, (i) said fourth article transferring means including a movable member and mechanism therefor for each of said conveying units, said mechanisms being operable to move said members to regulate the movement of articles on said collecting lines to said second elevator means, and means for operating said mechanisms, (j) a first control for the conveying system operable by means including material having dispatching information, such as a punched card, for example, said first control provided a path movement for the material, means for moving the material along the path of movement, a plurality of first control elements along the path of movement, and first operating means responsive to the material fed to said first control and said first control elements to render said third article transferring means operable to selectively transfer articles from said feed line to the article receiving lines of said conveying units at the different levels, (k) each of said conveying units having a second control operable by means including material having dispatching information, such as a punched card, for example, each of said second controls providing a path of movement for the material and having means for moving the material along the path of movement and a plurality of second control elements along the path of movement, and second operating means responsive to the material fed to each of said second controls and said second control elements associated therewith to render said first article transferring means of each conveying unit operable to selectively transfer articles from its article receiving line to said storage paths associated therewith, and (l) each of said conveying units having a third control operable by means including material having dispatching information, such as a punched card, for example, each of said third controls providing a path of movement for the material and having means for moving the material along the path of movement and a plurality of third control elements along the path of movement, and third operating means responsive to the material fed to each of said third controls and said third control elements associated therewith to render said second article transferring means of each conveying unit operable to selectively transfer articles from its storage paths to said article collecting line associated therewith.

References Cited

UNITED STATES PATENTS

| | | |
|---|---|---|
| 2,722,322 | 1/1955 | Gunderson. |
| 3,040,913 | 6/1962 | Foster et al. |
| 3,049,247 | 8/1962 | Lemelson. |

FOREIGN PATENTS

| | | |
|---|---|---|
| 717,018 | 10/1954 | Great Britain. |

GERALD M. FORLENZA, Primary Examiner

R. B. JOHNSON, Assistant Examiner

U.S. Cl. X.R.

214—11, 16